US012659239B2

(12) United States Patent
Knight et al.

(10) Patent No.: US 12,659,239 B2
(45) Date of Patent: Jun. 16, 2026

(54) CONFIGURATION OF COMPUTING DEVICES BASED ON GEOGRAPHIC PATTERN DETECTION

(71) Applicant: ADP, Inc., Roseland, NJ (US)

(72) Inventors: Tori Knight, Pasadena, CA (US); Jonathon Gumbiner, Roseland, NJ (US); Umasankar Thanikachalam, Glendora, CA (US)

(73) Assignee: ADP, Inc., Roseland, NJ (US)

( * ) Notice: Subject to any disclaimer, the term of this patent is extended or adjusted under 35 U.S.C. 154(b) by 52 days.

(21) Appl. No.: 18/744,034

(22) Filed: Jun. 14, 2024

(65) Prior Publication Data

US 2024/0422075 A1     Dec. 19, 2024

Related U.S. Application Data

(60) Provisional application No. 63/521,624, filed on Jun. 16, 2023.

(51) Int. Cl.
*G06F 15/16*          (2006.01)
*H04L 41/22*          (2022.01)
*H04W 4/029*          (2018.01)

(52) U.S. Cl.
CPC ............. *H04L 41/22* (2013.01); *H04W 4/029* (2018.02)

(58) Field of Classification Search
CPC ............................... H04L 41/22; H04W 4/029
USPC .................................. 709/200–203, 217–224
See application file for complete search history.

(56) References Cited

U.S. PATENT DOCUMENTS

| | | | | |
|---|---|---|---|---|
| 8,000,726 B2 * | 8/2011 | Altman | ................... | H04L 51/58 |
| | | | | 455/457 |
| 8,073,461 B2 * | 12/2011 | Altman | ................. | H04L 67/306 |
| | | | | 455/457 |
| 8,893,243 B2 * | 11/2014 | Hald | ....................... | G06F 21/43 |
| | | | | 726/7 |
| 9,027,042 B2 * | 5/2015 | Lonstein | ............ | H04N 21/6543 |
| | | | | 455/411 |
| 9,356,942 B1 * | 5/2016 | Joffe | .................... | H04L 63/1408 |
| 9,383,441 B2 * | 7/2016 | Younis | ................... | H01Q 15/14 |
| 9,454,889 B2 * | 9/2016 | Kerning | .................. | H04W 4/14 |
| 9,503,533 B2 * | 11/2016 | Altman | ................. | H04L 67/306 |
| 9,515,724 B2 * | 12/2016 | Tillet | ...................... | H04W 4/60 |
| 9,674,222 B1 * | 6/2017 | Joffe | .................... | H04L 63/1408 |
| 9,872,149 B2 * | 1/2018 | Alsehly | ................. | H04W 4/029 |

(Continued)

*Primary Examiner* — Moustafa M Meky
(74) *Attorney, Agent, or Firm* — Foley & Lardner LLP

(57)          ABSTRACT

Configuring computing devices based on geographic pattern detection is provided. A system provides a first mapping application on computing devices. The first mapping application can display an approximate location of each computing device of the computing devices. The system provides interactive interface elements to the computing devices. The interactive interface elements adjust the approximate location having a first resolution to an actual location having a second resolution that is greater than the first resolution for each of the computing devices. The system receives the adjustments to the approximate locations, and categorizes an actual location received from the computing devices to generate a consolidated view of the actual location for each respective computing device. The system displays, via a second mapping application, a consolidated view of the actual locations of the computing devices.

19 Claims, 15 Drawing Sheets

(56)  References Cited

U.S. PATENT DOCUMENTS

|  |  |  |  |  |
|---|---|---|---|---|
| 9,921,292 | B2 * | 3/2018 | Yang | H04B 17/318 |
| 10,230,761 | B1 * | 3/2019 | Joffe | H04L 63/1441 |
| 10,310,069 | B2 * | 6/2019 | Younis | G01S 13/867 |
| 10,893,087 | B1 * | 1/2021 | Munoz | H04L 65/65 |
| 11,140,193 | B2 * | 10/2021 | Patel | G06F 21/577 |
| 11,217,267 | B2 * | 1/2022 | Han | G01S 5/20 |
| 11,330,033 | B2 * | 5/2022 | Munoz | H04L 65/61 |
| 2002/0102989 | A1 * | 8/2002 | Calvert | H04W 64/00 |
|  |  |  |  | 455/457 |
| 2008/0132251 | A1 * | 6/2008 | Altman | G06Q 30/0268 |
|  |  |  |  | 455/457 |
| 2008/0132252 | A1 * | 6/2008 | Altman | H04W 4/021 |
|  |  |  |  | 455/457 |
| 2012/0172062 | A1 * | 7/2012 | Altman | G06T 11/206 |
|  |  |  |  | 455/457 |
| 2012/0245936 | A1 * | 9/2012 | Treglia | G06F 16/685 |
|  |  |  |  | 704/235 |
| 2014/0250191 | A1 * | 9/2014 | Altman | H04L 67/306 |
|  |  |  |  | 709/204 |
| 2015/0019347 | A1 * | 1/2015 | Naghdy | G06Q 30/0275 |
|  |  |  |  | 705/14.71 |
| 2016/0027292 | A1 * | 1/2016 | Kerning | H04W 4/02 |
|  |  |  |  | 455/404.2 |
| 2016/0054440 | A1 * | 2/2016 | Younis | G01S 13/867 |
|  |  |  |  | 342/55 |
| 2016/0233949 | A1 * | 8/2016 | Tillet | H04W 4/10 |
| 2017/0108575 | A1 * | 4/2017 | Yang | G01S 5/0268 |
| 2018/0115875 | A1 * | 4/2018 | Alsehly | G01C 21/206 |
| 2020/0211002 | A1 * | 7/2020 | Steinberg | G06Q 20/385 |
| 2021/0136137 | A1 * | 5/2021 | Munoz | H04L 51/224 |
| 2021/0211452 | A1 * | 7/2021 | Patel | H04L 63/1416 |
| 2022/0082705 | A1 * | 3/2022 | Graves | G01S 19/50 |
| 2025/0012576 | A1 * | 1/2025 | Graves | G01C 21/12 |

* cited by examiner

500

User logs into web application
502

Determine multiple
log-ins from different IP addresses
505

NO

End

YES

Determine location of the IP addresses
510

Consolidate and Build Library
515

CONFIGURATION OF COMPUTING DEVICES BASED ON GEOGRAPHIC PATTERN DETECTION

CROSS-REFERENCE TO RELATED APPLICATIONS

This application claims the benefit of priority under 35 U.S.C. § 119 to U.S. Provisional Patent Application No. 63/521,624, filed Jun. 16, 2023, which is hereby incorporated herein by reference in its entirety.

TECHNICAL FIELD

This disclosure relates to computing technology, and particularly to selecting and executing configuration programs on computing devices based on patterns associated with the physical locations of the computing devices.

BACKGROUND

Computing policies can be applied to computing devices to facilitate operation of the computing device, thereby maintaining performance, security, or functionality of the computing device. However, it can be challenging to apply a policy based on a location of a device accessing a web application. For example, it can be challenging to apply the policy due to challenges associated with accurately and precisely determining the location of the computing device due to web applications lacking integration with location or cellular services. While an approximate location of the computing device may be tracked through an IP address, the approximate location from such tracking techniques is error prone as it is difficult to interpret due to various formats of such data.

SUMMARY

Aspects of the technical solutions described herein can provide for more accurately determining the location of a computing device. By using a more accurate location of the computing device, the technical solutions can more accurately select and apply a device configuration, program configuration, or policy (e.g., a statutory policy or an internal organizational policy), while reducing the likelihood of erroneous application of such configurations. The technical solutions can be provided on a computer system which is configured to determine an accurate location of a computing device which can indicate the working location of an employee accessing a web application, in some examples. For example, the technical solutions allow an administrator to visually ascertain an actual location of employees accessing web applications over a computer network to enforce policies that include, for example, tracking of employee time, determining whether access to a particular application is permitted at a particular location, or to make other policy decisions at described herein based on the actual location of the user, etc.

An aspect of the technical solutions described herein can be directed to a method. The method can be performed by a computer system that includes one or more processors coupled with memory. The method can include the computer system providing on each of a plurality of computing devices, a display of an approximate location of each computing device of the plurality of computing devices. The method can include the computer system providing a plurality of interactive interface elements to the plurality of computing devices. The plurality of interactive interface elements can be configured to adjust the approximate location having a first resolution to an actual location having a second resolution that is greater than the first resolution for each respective computing device of the plurality of computing devices. The method can include the computer system receiving the adjustments to the approximate locations from the plurality of computing devices. The method can include the computer system categorizing one or more actual locations received from the plurality of computing devices to generate a consolidated view of the actual location for each respective computing device. The method can include the computer system displaying a consolidated view of the actual locations of each of the respective computing devices of the plurality of computing devices.

An aspect of the technical solutions described herein can be directed to a method. The method can be performed by a computer system that includes one or more processors coupled with memory. The method can include the computer system providing a first mapping application on each of a plurality of computing devices. The first mapping application can display an approximate location of each computing device of the plurality of computing devices. The method can include the computer system providing a plurality of interactive interface elements to the plurality of computing devices. The plurality of interactive interface elements can be configured to adjust the approximate location having a first resolution to an actual location having a second resolution that is greater than the first resolution for each respective computing device of the plurality of computing devices. The method can include the computer system receiving the adjustments to the approximate locations from the plurality of computing devices. The method can include the computer system categorizing one or more actual locations received from the plurality of computing devices to generate a consolidated view of the actual location for each respective computing device. The method can include the computer system displaying, via a second mapping application, a consolidated view of the actual locations of each of the respective computing devices of the plurality of computing devices.

In some cases, the approximate location of each respective user of the plurality of computing devices is based on an IP address. The method can include the computer system providing an interactive interface element for the user to validate the approximate location as the actual location.

The first mapping application can include a geo-boundary. The second mapping application includes a geo-boundary associated with one or more policies. The method can include the computer system building a library which associates the actual locations to different IP addresses. The library can refine the approximate location based on previously associated actual locations. The first mapping application on each of the plurality of computing devices can be generated upon logging into a web-based application.

The method can include the computer system determining that a subset of the plurality of computing devices are accessing a web application through a virtual area network. The method can include the computer system determining the actual location of the users of the subset of the plurality of user devices.

The method can include the computer system applying a policy based on the actual location of each of the respective user of the plurality of user devices. The method can include the computer system determining that multiple logins from a subset of the plurality of computing devices are from a same location. The method can include the computer system stacking all approved locations under single pin on the second mapping application.

An aspect of the technical solutions described herein can be directed to a system. The system can include one or more processors coupled with memory. The one or more processors can provide a first mapping application on each of a plurality of computing devices. The first mapping application can display an approximate location of each computing device of the plurality of computing devices. The one or more processors can provide a plurality of interactive interface elements to the plurality of computing devices. The plurality of interactive interface elements can be configured to adjust the approximate location having a first resolution to an actual location having a second resolution that is greater than the first resolution for each respective computing device of the plurality of computing devices. The one or more processors can receive the adjustments to the approximate locations from the plurality of computing devices. The one or more processors can categorize one or more actual locations received from the plurality of computing devices to generate a consolidated view of the actual location for each respective computing device. The one or more processors can display, via a second mapping application, a consolidated view of the actual locations of each of the respective computing devices of the plurality of computing devices.

An aspect of the technical solutions described herein can be directed to a system. The system can include one or more processors coupled with memory. The one or more processors can display, via one or more mapping applications on a computing device, an approximate location of the computing device. The one or more processors can provide a plurality of interactive interface elements to the computing device. The plurality of interactive interface elements can be configured to adjust the approximate location having a first resolution to an actual location having a second resolution that is greater than the first resolution for the computing device. The one or more processors can receive, via the interactive interface element, an adjustment to the approximate location from the computing device. The one or more processors can categorize an actual location received from one or more computing devices to generate a consolidated view of the actual location for each respective computing device of the one or more computing devices. The one or more processors can display, via the one or more mapping applications, a consolidated view of the actual locations of each of the respective computing devices of the one or more computing devices.

An aspect of the technical solutions described herein can be directed to a non-transitory computer readable medium storing processor executable instruction that, when executed by one or more processors, cause the one or more processors to provide a first mapping application on each of a plurality of computing devices. The first mapping application can display an approximate location of each computing device of the plurality of computing devices. The executable instructions can cause the one or more processors can provide a plurality of interactive interface elements to the plurality of computing devices. The plurality of interactive interface elements can be configured to adjust the approximate location having a first resolution to an actual location having a second resolution that is greater than the first resolution for each respective computing device of the plurality of computing devices. The executable instructions can cause the one or more processors can receive the adjustments to the approximate locations from the plurality of computing devices. The executable instructions can cause the one or more processors can categorize one or more actual locations received from the plurality of computing devices to generate a consolidated view of the actual location for each respective computing device. The executable instructions can cause the one or more processors can display, via a second mapping application, a consolidated view of the actual locations of each of the respective computing devices of the plurality of computing devices.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
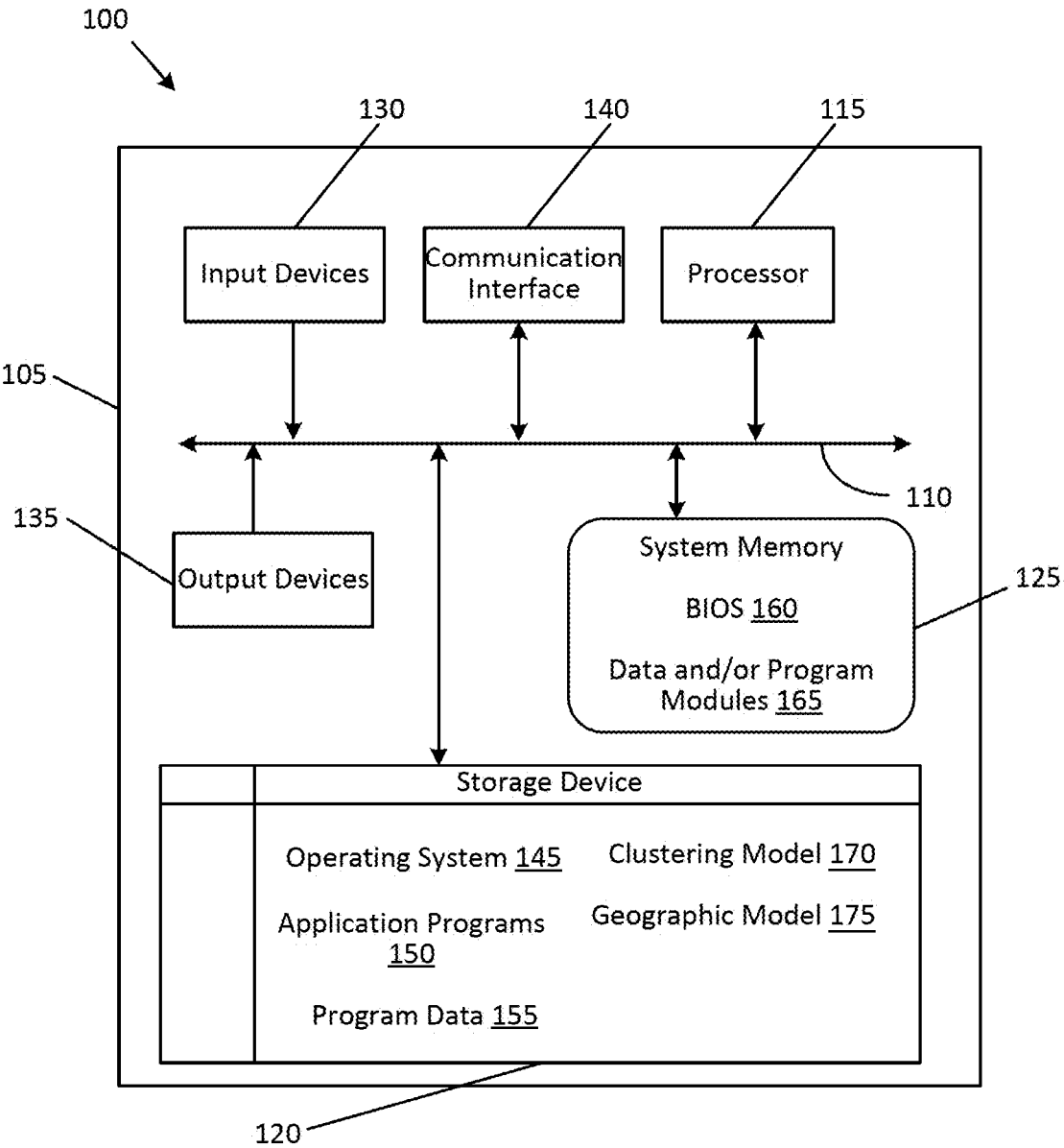
FIG. 1 is an illustrative architecture of a computing system implemented in embodiments of the present disclosure.

This disclosure relates generally to computing technology that can determine an accurate location of a user computing device and, more particularly, to a system, method and computer program product to receiving an IP address and converting the IP address to a physical location to present on a graphical user interface, resulting in a more accurate and computationally efficient technique to enforce computing device policies or configuration when the device accesses a web application. In this way, the technical solutions described herein leverage input provided via an interface that can validate or adjust the approximate location to an actual location. For an administrator, the actual location of users can be consolidated and overlaid on a single mapping application to allow an administrator to visually ascertain the location of users accessing web applications to apply and enforce appropriate policies. Advantageously, by implementing the different aspects of the present disclosure, it is no longer necessary for a separate, redundant system or computing device to translate an IP address into a physical location, which can be time consuming, inaccurate, and consume unnecessary processor, memory, or network resources, while introducing latency or delays in functions performed by the computing technology.

There can be two types of IP addresses provided by an ISP provider: static IP addresses and dynamic IP addresses. An internet service provider (ISP) provider can be communicably coupled to a DHCP server which can be configured to assign IP addresses to a computing device based on a MAC address provided by a modem. A dynamic IP address is a temporary IP address which the ISP can allow a computing device to for a period of time. For example, the DHCP server can periodically rotate the dynamic IP address for each computing device after a certain period of time (e.g., 24 hours, etc.). A static IP address is hardcoded into the server when a static IP is used. A static IP address is what is returned when an external program requests an IP address. For example, the system and method described herein requests the IP address of a computing device, a static IP address can be returned.

The tools address one or more technical problems or technical challenges. The technical solutions can be provided on, or integrated with, a computer system which includes a processor, a computer readable memory, one or more computer readable storage media, and program instructions collectively stored on the one or more computer readable storage media. For example, the tools allow an administrator to visually ascertain an actual location of employees accessing web applications over a computer network to enforce policies such as, tracking of employee time, determining whether access to a particular application is permitted at a particular location, or to make other policy decisions at described herein based on the actual location of the user, etc.

In more specific embodiments, the tools provided herein are configured to and are capable of providing the following functionality on a computing infrastructure, system, or computer program product (e.g., software product):

(i) substitute an IP address with an actual location of a user;

(ii) provide the user with the ability to validate or adjust the approximate location to an actual location;

(iii) build and display a library of approximate locations (e.g., IP addresses) and adjusted locations, e.g., that have been approved (registered locations));

(iv) provide the actual location of users on a map;

(v) enforce policies, e.g., for web access approval or rejection, clock in and clock out an employee based on time, etc.;

(vi) assume a boundary to consolidate location requests/addresses;

(vii) show all employee requests for specific addresses;

(viii) show an IP address or address range related to a physical address;

(ix) consolidate all IP addresses for the same physical location to help employees change the physical location to a close but not accurate location;

(x) when there is a significant response from employees from the same IP address associated with two or more locations, mark accessing as coming through a VPN and surface multiple locations with the same VPN address, while tying the specific location to the employees.

It should be understood that, to the extent implementations of the invention collect, store, or employ personal information provided by, or obtained from, organizations, such information shall be used in accordance with all applicable laws concerning protection of personal information. Additionally, the collection, storage, and use of such information can be subject to consent of the individual or corporation to such activity, for example, through "opt-in" or "opt-out" processes as can be appropriate for the situation and type of information. Storage and use of personal information can be anonymized and stored in an appropriately secure manner reflective of the type of information, for example, through various encryption and anonymization techniques for particularly sensitive information.

Implementations of the present disclosure can be a computer system, a computer-implemented method, and/or a computer program product. The computer program product is not a transitory signal per se, and can include a computer readable storage medium (or media) having computer readable program instructions thereon for causing a processor to carry out aspects of the present disclosure. As described herein, the computer readable storage medium (or media) is a tangible storage medium (or media). It should also be understood by those of skill in the art that the terms media and medium are used interchangeable for both a plural and singular instance.

Further, the present disclosure relates generally to tools to build a library of physical locations of users and, more particularly, to a system, method and computer program product which is capable of building a precise physical location library associated with IP addresses and locations of mobile devices obtained from crowdsourcing and to automate and grant time capture permissions by leveraging the precise physical location library. By way of example, the system, method and computer program product (hereinafter referred to as "tool(s)") use crowdsourcing to build a precise location library of a sample set of users based on IP addresses, types of IP addresses (e.g., dynamic, static, VPN), IP ranges, location of mobile devices when access a mobile application, etc. and the known locations of the sample set of users across different platforms, channels, etc. The precise location library can, in turn, be leveraged to enforce organizational policies such as automating a setup of time capture access permissions of employees across different channels, in addition to enforcing other organizational policies such as allowing or denying user access to web-based applications or mobile applications etc., as further described herein.

By way of example, permissions for employees to capture time is a concern for employers since non-exempt employees are paid for every minute worked, and accurate physical location information of the employee at the start and end of a workday is important to prevent time theft. It is known to be a tedious task to setup mobile application and web application time capture permissions since they use different parameters to define location permissions (e.g., mobile applications use latitude and longitude (e.g., Global Positioning System (GPS) coordinates) and web applications use IP address). Also, assignment of employees to each mobile location and web application IP address is required to define physical location permissions for time capture, which is another tedious, time consuming and difficult task to accomplish. Additionally, IP routing numbers are most often dynamic, requiring multiple requests and reviews of the same employees at the same locations.

To solve the above and other problems, embodiments of the present invention obtain IP addresses, types of IP addresses and IP ranges, and a location or location type (e.g., personal, office or public locations, etc.) from a sample set of users, which are used as a training set by machine learning to find patterns and learn physical locations associated with such IP addresses, types of IP addresses, and IP ranges. For example, the IP addresses, types of IP addresses, IP ranges, etc. are obtained by crowdsourcing to learn patterns (e.g., physical locations of users) across a sample size of users, e.g., employees, using machine learning and artificial intelligence. The patterns can be learned by using longitudinal/ latitudinal or GPS coordinates of each user of the sample set of users, and associating the coordinate information (e.g., physical locations of the user) with their IP addresses or type of IP address, or by reverse web access decisions, e.g., reverse IP or DNS lookup as is known in the art. For example, the reverse IP lookup will check DNS records to locate an address and map a domain name to the physical IP address of the device. This helps determine the virtual hosts from web servers. This can be performed by querying a IPv4 address or Ipv6 address to find the hostname by entering the IP address into a reverse lookup tool to locate the domain associated with the corresponding IP address.

As should be understood by those of ordinary skill in the art, when a user connects to the Internet through an Internet service provider (ISP), the ISP assigns the user an IP (Internet Protocol) address. The IP address is a unique string of numbers linked to an Internet-connected or network-connected device. The IP address will identify the device and allows it to communicate with other devices on an internal or external network, or even across the Internet. The IP address, by design, can be tracked, to indicate the user's general location when accessing the Internet. For example, the IP address contains some geographical location information including, e.g., country, state, city and zip code of the where the device is located. To find the location of an IP address, it is possible thus to use an IP lookup tool as is known in the art. The results of the tool reveal where the IP was registered, the location of the controlling agency, whether or not the user has a proxy or VPN enabled, and the status of their connection. Furthermore, the tool also provides available geolocation data for any given IP address. In embodiments, should a user (e.g., of the sample set of users) log into a web application and have their mobile device nearby, the tool can also leverage the GPS data from their mobile device to reflect their physical location more accurately.

The learned location information is used to build a library so as to automate and grant time capture permissions at set-up or log in of the web-based application or mobile application by an employee. For example, the library can be formatted as a look-up table (e.g., precise location library), which is used to determine a specific location or location type (e.g., personal, office or public locations) of a subsequent user logging into a web-based application or mobile application with a similar IP addresses or type of IP address or location as provided within the look-up table. The physical location of the user logging into the web-based application or mobile application can be used to enforce organizational policies associated with the physical location of the particular user such as time capture or allowing or denying user access to the web-based application or mobile application. Accordingly, it is now possible to use learned physical locations to automate setup of time capture access permissions across channels or enforce other organizational policies.

In view of the present disclosure, the tools provide one or more technical solutions to one or more technical problems. The technical solutions can be provided on, or integrated with, a computer system which includes a processor, a computer readable memory, one or more computer readable storage media, and program instructions collectively stored on the one or more computer readable storage media. For example, the tools provide a technical solution, e.g., practical application, of creating a precise location library built from crowdsourcing data of a sample set of users to determine physical locations of employees accessing web-based applications or mobile applications over a computer network using IP addresses, types of IP address, etc. of the user's logging into the mobile application or web-based application. Aspects of the tools can provide a further technical solution of automating the time capture process at log in or set up of a mobile application or a web-based application.

By way of example, an additional practical application allows the ability of an employer to enforce organization policies based on the physical location of a user accessing the web-based application or mobile application. The organization policies can include, e.g., tracking of employee time, determining whether access to a particular application is permitted at a particular location, or making other policy decisions as described herein based on the location of the user. Accordingly, the practical applications include consolidating IP addresses into a single library (e.g., look-up table) to easily and speedily determine the physical location of an employee and provide accurate time capture access permissions across channels, i.e., different applications, disparate systems, web access approval or rejection, clock in and clock out an employee based on location of the employee, etc.

As used herein, the crowdsourcing involves obtaining information, e.g., location information, from a group of users accessing a web-based application or mobile application as examples. The group of users can be any sample size of users, e.g., 100 users, etc. In embodiments, the location information can be automatically collected from users logging onto the web-based application, mobile application or other system including, e.g., human resources, benefits system, payroll system or other applications using longitudinal/latitudinal information or global position system (GPS) coordinates. For example, location information is obtained by mapping against IP addresses, types of IP addresses and/or IP ranges of the same group of users to obtain patterns of physical locations associated with certain IP addresses, types of IP addresses and/or IP ranges. The advantages of crowdsourcing include cost savings, speed, and the ability to obtain and learn locations precisely from a sample size. Accordingly, instead of relying on the individual's IP address alone, it is now possible to leverage the learned location information from IP addresses, IP address types (dynamic vs. static vs. VPN) and/or IP ranges, etc. obtained from the sample group to determine the physical location of an individual user logging into the web-based application or mobile application by simply referencing to the precise location library.

Also, as used herein, a web-based application is an application program that is stored on a remote server and delivered over the Internet through a browser interface. A mobile application, on the other hand, is a type of application software designed to run on a mobile device, such as a smartphone or tablet computer. Mobile applications frequently serve to provide users with similar services to those accessed on personal computers. It is possible to leverage both a web-based application and a location of the mobile device to obtain a physical location information when building the precise physical location library. For example, an IP address of a user on a web-based application can be mapped to a physical location of a mobile device of the user when such mobile device is known to be near the user.

It should be understood that, to the extent implementations of the invention collect, store, or employ personal information provided by, or obtained from, organizations, such information shall be used in accordance with all applicable laws concerning protection of personal information. Additionally, the collection, storage, and use of such information can be subject to consent of the individual or corporation to such activity, for example, through "opt-in" or "opt-out" processes as can be appropriate for the situation and type of information. For example, a user or employee logging into a web-based application or mobile application for the first time can be asked for consent to track their location in order for an employer to enforce policies based on the user and their location. Illustratively, the tools would request permission from the sample group to access their locations via latitude and longitude (e.g., GPS coordinate) from a mobile device. In addition, the tools would request permission from the sample group to access their locations via latitude and longitude (e.g., GPS coordinate) from a mobile device when accessing, for example, a web application. This information can then be used by machine learning to build a library of precise physical location information which can then be used to leverage time capture process upon login by an employee. Storage and use of personal information can be anonymized and stored in an appropriately secure manner reflective of the type of information, for example, through various encryption and anonymization techniques for particularly sensitive information.

Implementations of the present disclosure can be a computer system, a computer-implemented method, and/or a computer program product. The computer program product is not a transitory signal per se, and can include a computer readable storage medium (or media) having computer readable program instructions thereon for causing a processor to carry out aspects of the present disclosure. As described herein, the computer readable storage medium (or media) is a tangible storage medium (or media). It should also be understood by those of skill in the art that the terms media and medium are used interchangeable for both a plural and singular instance.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
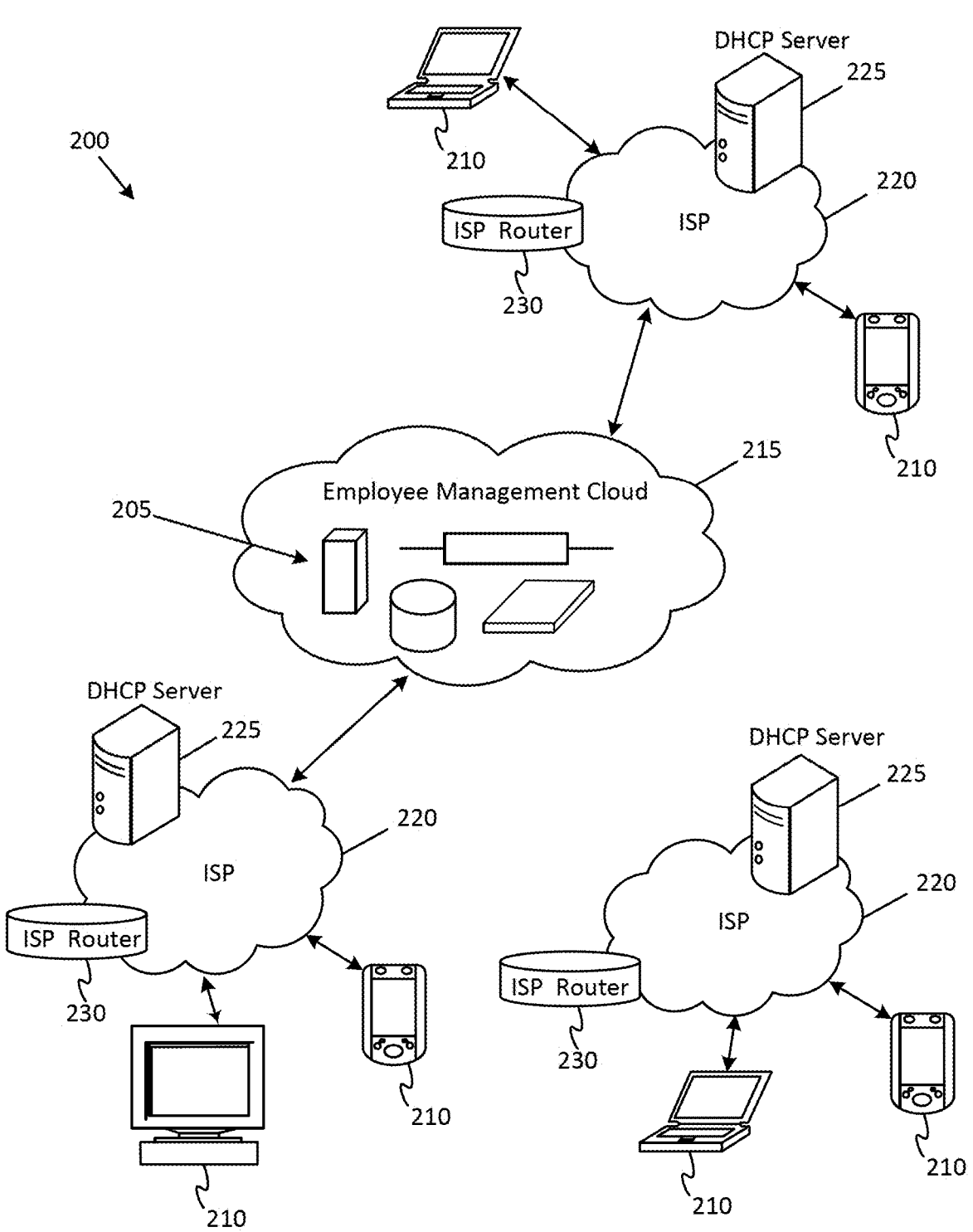
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or can be a separate independent computing device (e.g., a computing device of a third-party service provider). The computing device 105 can include a bus 110, a processor 115, a storage device 120, a system memory (hardware device) 125, one or more input devices 130, one or more output devices 135, and a communication interface 140.

The bus 110 permits communication among the components of computing device 105. For example, bus 110 can be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 can be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which can be operatively implemented by the computer readable program instructions.

For example, after an opt-in process, processor 115 enables the computing device 105 to convert an IP address to an approximate location of the user accessing a web application through a computing device. The processor 115 enables the computing device 105 to allow the user to adjust or validate the approximate location with an actual location of the user. Illustratively, processor 115 can generate a map on a user interface with an approximate location of the user. To adjust the location, the user can drag and drop a pin at an actual location of the user. Also, location information of the user device, should it be activated, can automatically populate the mapping application with the actual location of the user.

Additionally, after an opt-in process in which users of a sample set of users provide permission to collect information, e.g., location information and IP address information, processor 115 enables the computing device 105 to collect location information of a sample set of users accessing web-based applications, mobile applications or other application. The location information can be obtained by mapping IP address information to GPS coordinate or longitudinal/latitudinal coordinate information as described herein. In this way, using crowdsourcing, it is possible to build a location library of IP addresses and their related physical locations. It is also possible to leverage both an IP address and a physical location of a mobile device when the user accesses a web-based application. For example, when a user logs into a web-based application and has a mobile device nearby, the physical location of the mobile device can be mapped to the IP address, for example, in order to build the precise physical library. The precise physical library can be used to validate other users to automate the capture time of employees as well as access or deny access to certain applications.

Also, as should be understood by those of skill in the art, the computing device 105 uses machine learning and artificial intelligence to learn patterns across different users by learning physical locations of the users related to IP addresses, IP types, IP ranges based on associated longitudinal/latitudinal coordinates and GPS location. As should be understood by those of skill in the art, the machine learning can be, for example, neural networks, Bayes classifiers, k-nearest neighbor, K-means clustering or other models as are known in the art, each of which use as training data information obtained by the sample set of users, e.g., IP addresses correlated to a physical location.

For example, in web-based applications, when a user, e.g., employee, logs into a web-based application, the computing device 105 (e.g., collectively also known as the tools) collects the IP address of the user and/or the longitudinal/longitudinal coordinate information. In mobile devices, the computing device 105 captures the GPS location of a mobile device of the user. In this way, the tools are able to correlate the IP address information to a physical location. The physical location of the user, as captured, is then correlated to the IP addresses of the sample group of users to build the precise physical location library. The information in the precise physical location library can then be used to automate a time capture process for an employee when they log into a web-based application or mobile application. This is accomplished by, for example, correlating the user's (e.g., employees) IP address to the physical location associated with the same or similar IP address in the precise physical location library.

More specifically, based on the physical location captured of the sample group of users, the computing device 105 builds the precise location library by mapping or correlating the IP address information of the sample set of users logging into the web-based application or the mobile application, etc. to the physical location of the user. For example, the precise physical location library can be formatted as a look-up table accessed by the computing device 105, which then correlates the IP address of the new user logging into the web-based application or mobile application to their physical location learned from using the sample set of users in the crowdsourcing. The physical location of the user can be used to enforce or apply a particular policy associated with the particular user, including to validate automate setup of time capture access permissions across channels as described herein.

In embodiments, the machine learning can accelerate its learning based on collected data across users (employees). For example, the computing device 105 can determine if the IP address is associated with a static IP or dynamic IP. If, for example, the IP address is a dynamic IP, based on the learning, it is also possible to determine if the IP address is associated with a virtual private network (VPN) as described further herein. In this case, the machine learning will learn the IP range (e.g., range of IP addresses and respective locations) and, with this information, determine anomalies based on user location. For example, if an employer only wants an employee to work from home or office, and it is detected that the user is working from a public location, it is now possible to enforce a policy to auto decline access to the web-based application or mobile application or flag a working condition from an unapproved location, or to deny access to time capture programs. In addition, the machine learning can also continue learning, refining and updating the physical location library based on subsequent employees logging into a web-based application or mobile application, in a similar manner as described with respect to the sample set of users.

The approximate location and actual physical location can be provided to an administrative console, which generates a consolidated view of the actual locations of users (e.g., employees) accessing different web applications over a network. For example, processor 115 generates a single view of access controls and the mapping application overlaid with the actual location of the users which, in turn, provides improved day to day management capabilities. In some embodiments, the processor 115 can automatically approve certain locations for employees based on certain rules. In some embodiments, the processor 115 can automatically approve a location when a certain number of employees requested the same location for the same IP address. In some embodiments, the processor 115 can automatically approve a location when a certain number of employees acknowledge the location as an approved workplace. In some embodiments, the processor 115 can automatically approve a location when the IP address is within a learned IP address range. In some embodiments, the processor 115 can automatically approve a location when a certain number of requests are from the same web and mobile location. In some embodiments, the processor 115 can automatically approve a location received from a VPN which was previously manually approved by a manager.

Illustratively, processor 115 can stack all approved locations for particular web applications (and/or mobile applications) under single pin on a map. An approved location can refer to one or more locations where an employee is allowed to access a work application and/or certain types of work features. The consolidated view can allow, for example, a surface count of employees, a list of employees, a surface IP address tied to a physical location and/or a surface location marked as a VPN. In addition, it is now possible to more effectively enforce policies such as capture employee time based on the surface location, on both web access and mobile devices. These features are described and shown with reference to FIG. 11. Accordingly, by implementing the processes described herein, it is now possible to eliminate the need for an administrator to manually map locations and boundaries of where the employees can access time capture processes, which is tedious, time consuming, difficult and prone to errors. Moreover, as to day-to-day management, processor 115 can allow the manager to reverse automated decisions and flag non-restricted employees, as an example. It should be understood by those of skill in the art that the term "surface" refers to the visual display of information on a mapping application, as an example.

The processor 115 can also generate notifications to the administrator, e.g., managers, human resources personnel, etc., and the users. Also, processor 115 can use the actual location and the approximate location (based on the IP address) to build a library. The library can be used to refine the approximate location of future logins using the IP address. The processor 115 can also determine boundary violations as unexcused against a policy threshold. Moreover, processor 115 allows the administrator to adjust boundaries according to policies, e.g., permitted locations to work and clock in. In this way, the tools allow the administrator to set up rules to prevent a user from clocking outside of the boundaries.

In addition, processer 115 can be used to detect VPN access and allocate locations based on the VPN access. As to the latter, processor 115 can detect multiple logins from a same physical location, determine the physical location is a single point access, e.g., through a VPN, and using this information, request specific location information of each of the users accessing an application through the VPN.

In embodiments, processor 115 can receive input signals from one or more input devices 130 and/or drive output signals through one or more output devices 135. The input devices 130 can be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 can include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 can store operating system 145, application programs 150, and program data 155 in accordance with aspects of the present disclosure.

The system memory 125 can include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, can be stored in the ROM. Additionally, data and/or program modules 165, such as at least a portion of operating system 145, application programs 150, and/or program data 155, that are accessible to and/or presently being operated on by processor 115 can be contained in the RAM.

The storage device 120 can include a clustering model 170 and a geographic model 175 which are machine learning models configured to process an IP address and determine a location of a computing device associated with the IP address using machine learning. Specifically, the clustering model 170 is configured to store an IP address library of valid IP addresses which new IP data can be compared against in order to determine a valid location associated with the IP address. In some embodiments, the IP library can include a cluster of IP addresses which are all associated with one location. For example, in some embodiments, multiple workers can routinely work out of a satellite office. All the IP addresses associated with that satellite office can be grouped into a cluster such that when a worker tries to validate an IP address associated with the location of the satellite office, the system can recognize the IP address as a valid one. In some embodiments, the clustering model 170 can create new clusters after a certain criterion has been met. For example, if a certain number of devices with new IP address attempt to log into a web application from the same location, a cluster can be formed for any IP address that try to log into the web application from that location.

In some embodiments, the geographic model 175 is configured to determine whether the geographic data received when a worker attempts to log into the system is valid. In some embodiments, the geographic data can include latitude and longitude information provided mobile or web application on a computing device associated with the user. In other embodiments, the geographic data can include an address which the user can be prompted to enter whenever they attempt to log into the work system.

In some embodiments, the clustering model 170 and the geographic model 175 can be machine learning models. The clustering model 170 and the geographic model 175 can each include a random forest model, a statistical learning model, a neural network, regression model, and/or a machine learning model of another type. In some embodiments, the clustering model 170 and the geographic model 175 can each also include one or more lookup tables or graphs which can be used to support the inferences and estimations made by the machine learning models.

The communication interface 140 can include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 can be connected to remote devices or systems via one or more local area networks (LAN) and/or one or more wide area networks (WAN) using communication interface 140.

As discussed herein, computing system 100 can be configured to track location of a user accessing an application on a mobile application over a network. In particular, computing device 105 can perform tasks (e.g., process, steps, methods and/or functionality) in response to processor 115 executing program instructions contained in a computer readable medium, such as system memory 125. The program instructions can be read into system memory 125 from another computer readable medium, such as data storage device 120, or from another device via the communication interface 140 or server within or outside of a cloud environment. In embodiments, an operator can interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry can be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

As discussed herein, computing system 100 can be configured to create a precise location library of users accessing an application on a mobile application over a network. In particular, computing device 105 can perform tasks (e.g., process, steps, methods and/or functionality) in response to processor 115 executing program instructions contained in a computer readable medium, such as system memory 125. The program instructions can be read into system memory 125 from another computer readable medium, such as data storage device 120, or from another device via the communication interface 140 or server within or outside of a cloud environment. In embodiments, an operator can interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry can be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, which can be provisioned and released rapidly, dynamically, and with minimal management efforts and/or interaction with the service provider. In embodiments, one or more aspects, functions and/or processes described herein can be performed and/or provided via cloud computing environment 200.

As depicted in FIG. 2, cloud computing environment 200 includes an employee management cloud 215 which is connected to one or more internet services providers (ISPs) 220. The ISPs can be configured to provide internet to one or more client devices 210. In some embodiments, the employee management cloud 215 includes one or more cloud resources 205 can include a variety of hardware and/or software computing resources, such as servers, databases, storage, networks, applications, and platforms. In some embodiments, the cloud resources 205 can be on a single network or a distributed network. The cloud resources 205 can be distributed across multiple cloud computing systems and/or individual network enabled computing devices.

Multiple ISPs 220 can be connected to the employee management cloud 215. The ISPs can provide internet to one or more client devices 210. The client devices 210 can be utilized by one or employees to sign into a work system. In some embodiments, an employer can desire to monitor the location of the client device 210 to ensure that the employee is logging in from an approved location. Each of the ISPs 220 can include a DHCP server 225 which is a server that automatically provides and assigns network parameters, such as IP addresses, to the client devices 210. A DHCP server 225 can eliminate the need for the ISP 220 to manually set the IP address for each of the client devices 210. In some embodiments, the DHCP server can work with a modem to assign IP addresses to the client devices. The ISP 220 can also include an ISP router 230 which allows multiple devices, such as client devices 210, to connect to the internet network created by the modem.

Client devices 210 can comprise any suitable type of network-enabled computing device, such as servers, desktop computers, laptop computers, handheld computers (e.g., smartphones, tablet computers), set top boxes, and network-enabled hard drives. The cloud resources are typically provided and maintained by a service provider so that a client does not need to maintain resources on a local client device 210. In embodiments, the cloud resources can include one or more computing system 100 of FIG. 1 that is specifically adapted to perform one or more of the functions and/or processes described herein.

Cloud computing environment 200 can be configured such that the cloud resources provide computing resources to client devices 210 through a variety of service models, such as Software as a Service (Saas), Platforms as a service (PaaS), Infrastructure as a Service (IaaS), and/or any other cloud service models. The cloud resources can be configured, in some cases, to provide multiple service models to a client device 210. For example, the cloud resources can provide both SaaS and IaaS to a client device 210. The cloud resources 205 can be configured, in some cases, to provide different service models to different client devices 210. For example, the cloud resources can provide SaaS to a first client device 210 and PaaS to a second client device 210.

Cloud computing environment 200 can be configured such that the cloud resources provide computing resources to client devices 210 through a variety of deployment models, such as public, private, community, hybrid, and/or any other cloud deployment model. The cloud resources can be configured, in some cases, to support multiple deployment models. For example, the cloud resources can provide one set of computing resources through a public deployment model and another set of computing resources through a private deployment model.

In embodiments, software and/or hardware that performs one or more of the aspects, functions and/or processes described herein can be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

The cloud resources can be configured to provide a variety of functionality that involves user interaction. Accordingly, a user interface (UI) can be provided for communicating with cloud resources 205 and/or performing tasks associated with the cloud resources. The UI can be accessed via a client device 210 in communication with the cloud resources. The UI can be configured to operate in a variety of client modes, including a fat client mode, a thin client mode, or a hybrid client mode, depending on the storage and processing capabilities of the cloud resources and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

FIGS. 3-9 depict exemplary flows for processes in accordance with aspects of the present disclosure. The exemplary flows can be illustrative of a system, a method, and/or a computer program product and related functionality implemented on the computing system of FIG. 1, in accordance with aspects of the present disclosure. The computer program product can include computer readable program instructions stored on computer readable storage medium (or media). The computer readable storage medium can include the one or more storage medium as described with regard to FIG. 1, e.g., non-transitory media, a tangible device, etc. The method, and/or computer program product implementing the flows of FIGS. 3-9 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

Figure 3:
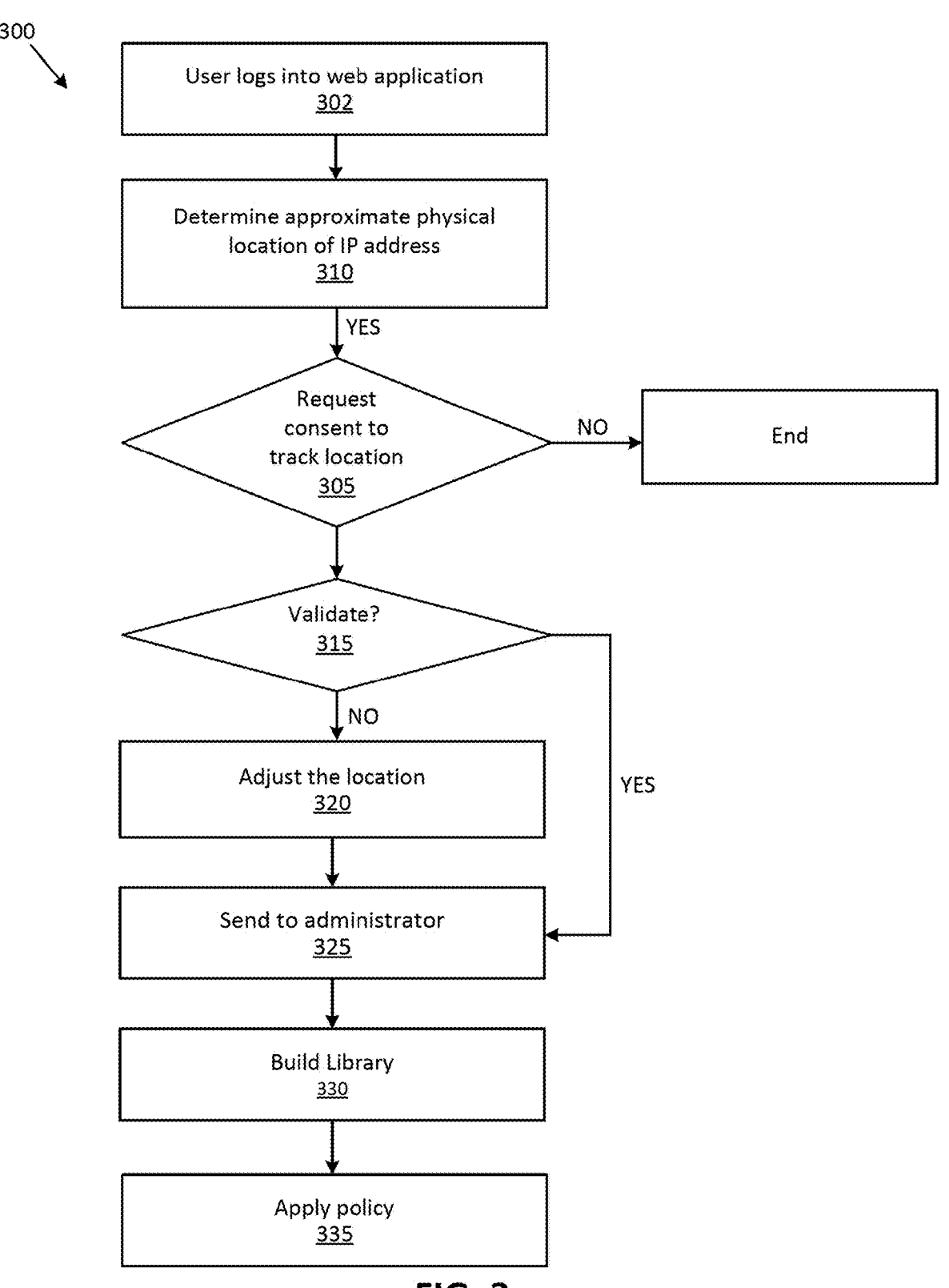
FIG. 3 depicts an exemplary flow process for validating or adjusting an actual location of a user accessing a web application, in accordance with aspects of the present disclosure.

FIG. 3 shows a process of validating or adjusting an actual location of a user accessing a web application on a client device through a network. In some embodiments, the process 300 can be implemented by the computing system 100 which can be operating within the computing environment 200. For example, at step 302, a user logs into a web application. This can be done via a mobile device, laptop or other computing system. In some embodiments, the user can log onto the web application at a variety of different locations and the IP address associated the client device accessing the web application will change based on the different locations. For example, if a user is accessing the web application from a home network or public network, a dynamic IP address can be provided. On the other hand, if the user is accessing the web application from a work network, then a static IP address can be provided. At step 305, the processes request consent to track the location of the user. If the user denies access, the processes end and the user can not be able to access the web application.

Figure 12:
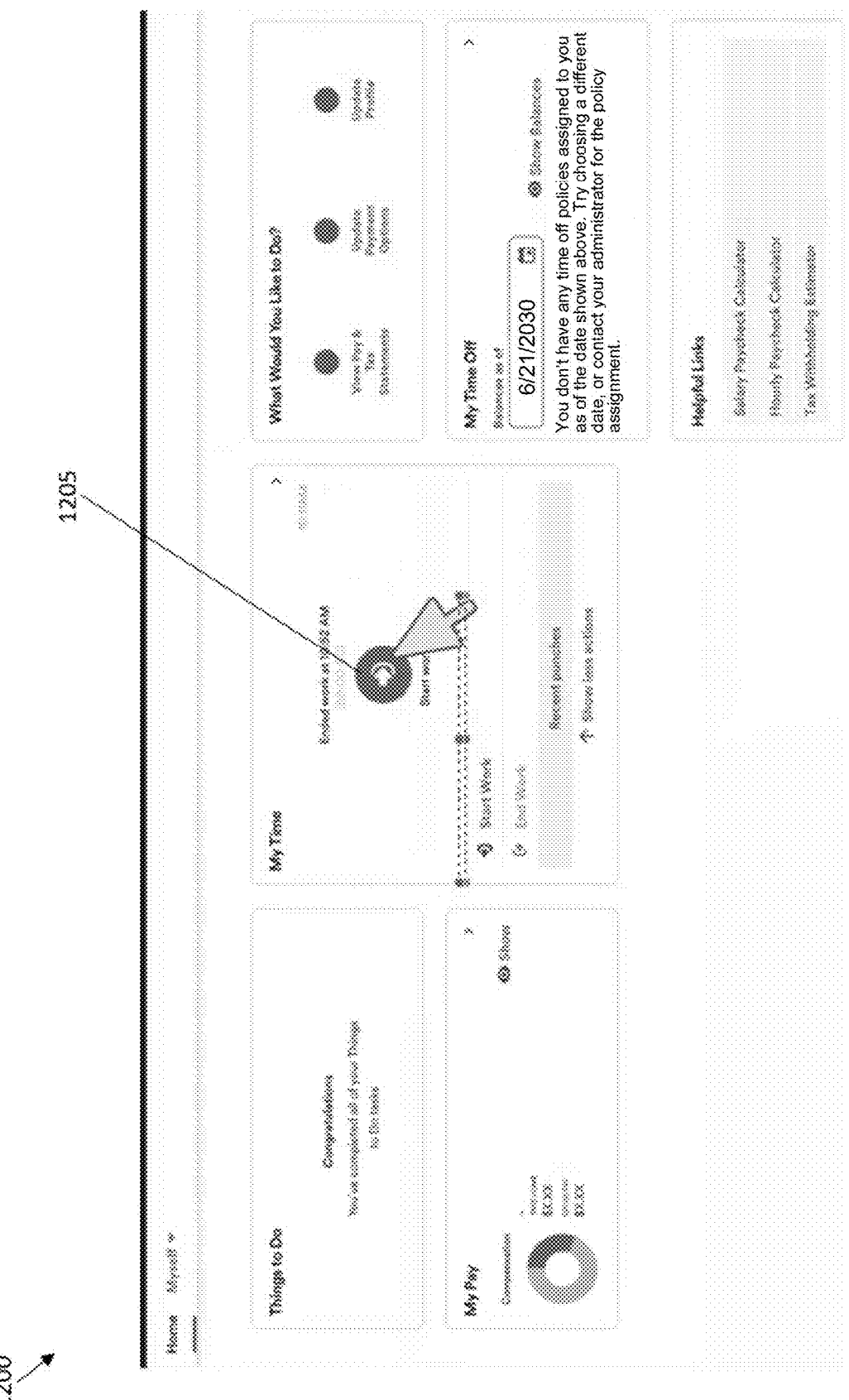
FIGS. 12-13 depicts a user interface for prompting the user for physical location, in accordance with aspects of the present disclosure.
Figure 13:
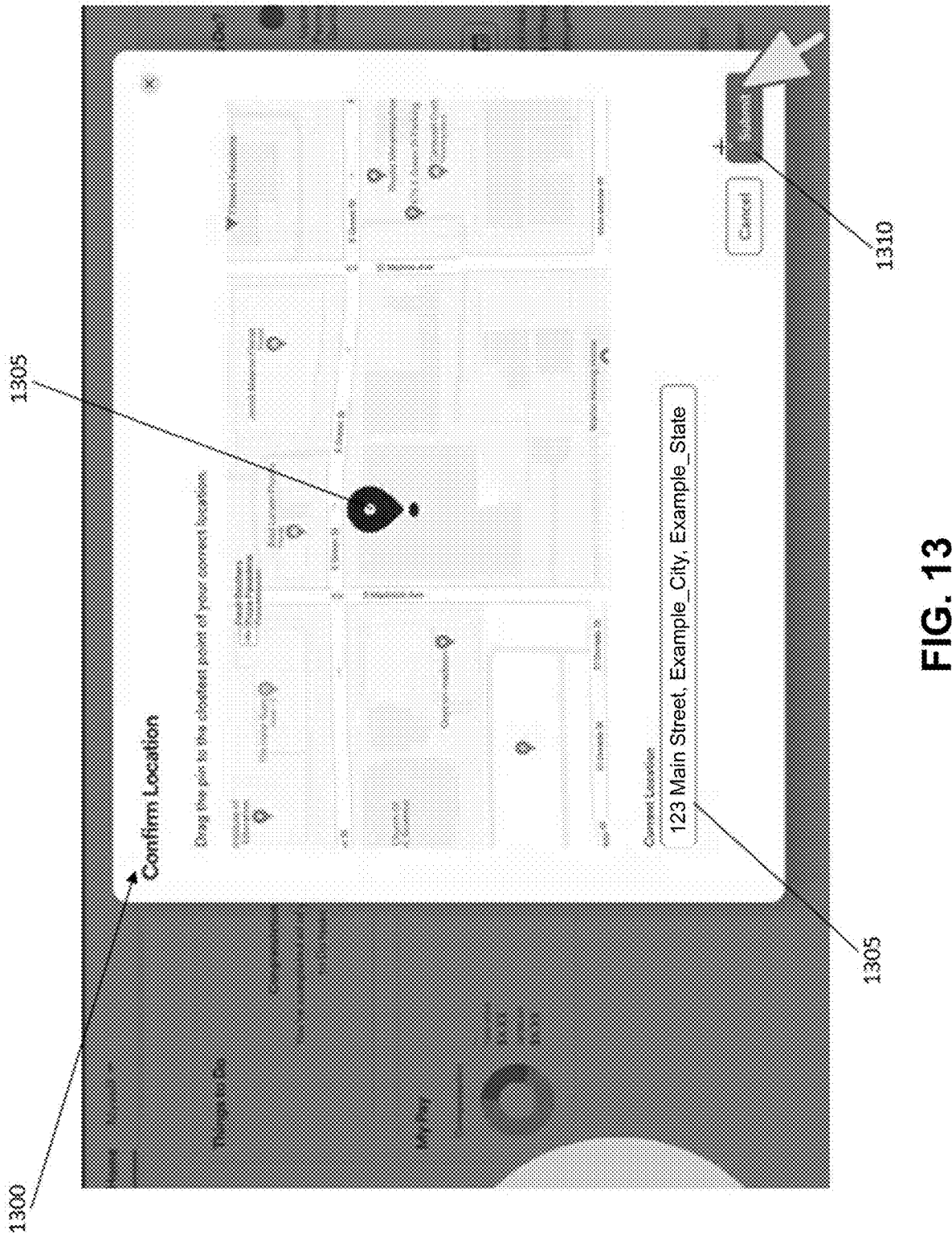

At step 310, upon opting-in, the processes determine an approximate location of the user based on an IP address. For example, the processes can provide a mapping application to the user which includes a pin designating the approximate physical location of the user based on an IP address. For example, referring now to FIGS. 12 and 13, a user interface for prompting the user for physical location is shown, according to an exemplary embodiment. Specifically, FIG. 12 shows user interface 1200. User interface 1200 includes a start work button 1205 that logs the user into the work system. Once the user clicks the start work button, the user interface displays the pop-up 1300 which shows the user the approximated location based on the IP address. The approximate location can have a first resolution or accuracy which can be less accurate than the precise actual location. For example, the first resolution can be 5% less accurate, 10% less accurate, 15% less accurate, 20% less accurate, or some other percentage or amount less accurate or precise relative to a second resolution of the actual location. For example, a location with a first resolution can indicate a device is located somewhere within a 500 meter radius, whereas a location with a second resolution can indicate the device is located somewhere within a 250 meter radius. At step 315, the user can validate the approximate address as the actual location thereby providing and confirming the actual location of the user. For example, referring back to FIG. 13, the user can validate the address by either clicking the submit button 1310 if the address is correct. If the address is not correct, the user can update the address by either moving a location pin 1305 or entering the correct location in box 1305. If validated, the processes will continue to step 325. The first resolution or accuracy of the approximate location can be less than the second resolution or accuracy of the actual location.

If the approximate location is not accurate, e.g., the user does not validate the address, at step 320, the user can provide the actual location. For example, using the mapping application, the user can drag and drop a pin at their actual location in the mapping application. In further embodiments, activated geolocation services can automatically populate the mapping application. In embodiments, the mapping application can also include boundaries set by the administrator. This latter feature will provide a visual display to the user of approved locations for access to the web application, as an example.

At step 325, both the approximate location (with IP address) and the actual location can be sent to the administrator for visual display on an administrative console. For example, the approximate location and the actual location can be visually generated to the administrator on a map or dashboard application on the administrative console. In embodiments, other configurations are also provided for display. For example, only the actual locations can be display with or without a geo-boundary. Additionally, other information can be displayed on, for example, a dashboard such as certain policies, IP addresses associated with VPNs, actual locations compared to IP addresses, etc.

At step 330, the approximate location (and/or IP address) and the actual location can be stored in a database, e.g., data device 120 shown in FIG. 1, in order to build an IP address library. The IP address library can be used to store commonly used IP addresses with corresponding locations which have been validated or confirmed to be accurate. In some embodiments, the IP address and their corresponding addressed stored in the IP library can have a corresponding confidence level based on how many people have validated that IP address in the past. Confidence can be gained when multiple users validate the same information (e.g., IP address with corresponding location. For example, an IP address with a corresponding location which has been validated only once can have a confidence level of 0 while another IP address with a corresponding location which has been validated fifty times can have a confidence level of 10. In embodiments, the library can be used to refine the approximate locations associated with the IP addresses (for future logins). For example, should the user log into the same router at a same location, the IP address can be matched to a known, actual location to accurately reflect the location of the user or other users.

At step 335, a policy can be enforced or modified based on the actual location of the user. These policies can include: (i) clocking in and out the employee authorized to work at certain locations; (ii) tax jurisdiction assignment; (ii) overtime policy assignment (which can be adjusted by the administrator); (iii) meal policy assignment (which can be adjusted by the administrator); (iv) break policy assignment (which can be adjusted by the administrator); (v) adjust policies and tax calculation based on work location for hybrid employees; (vi) access permissions content (e.g., permit or deny access to certain data based on high risk locations); (vii) denying access to certain information, (viii) dynamically update time zone allocation; and/or (ix) define the primary work location of the user; etc.

Figure 4:
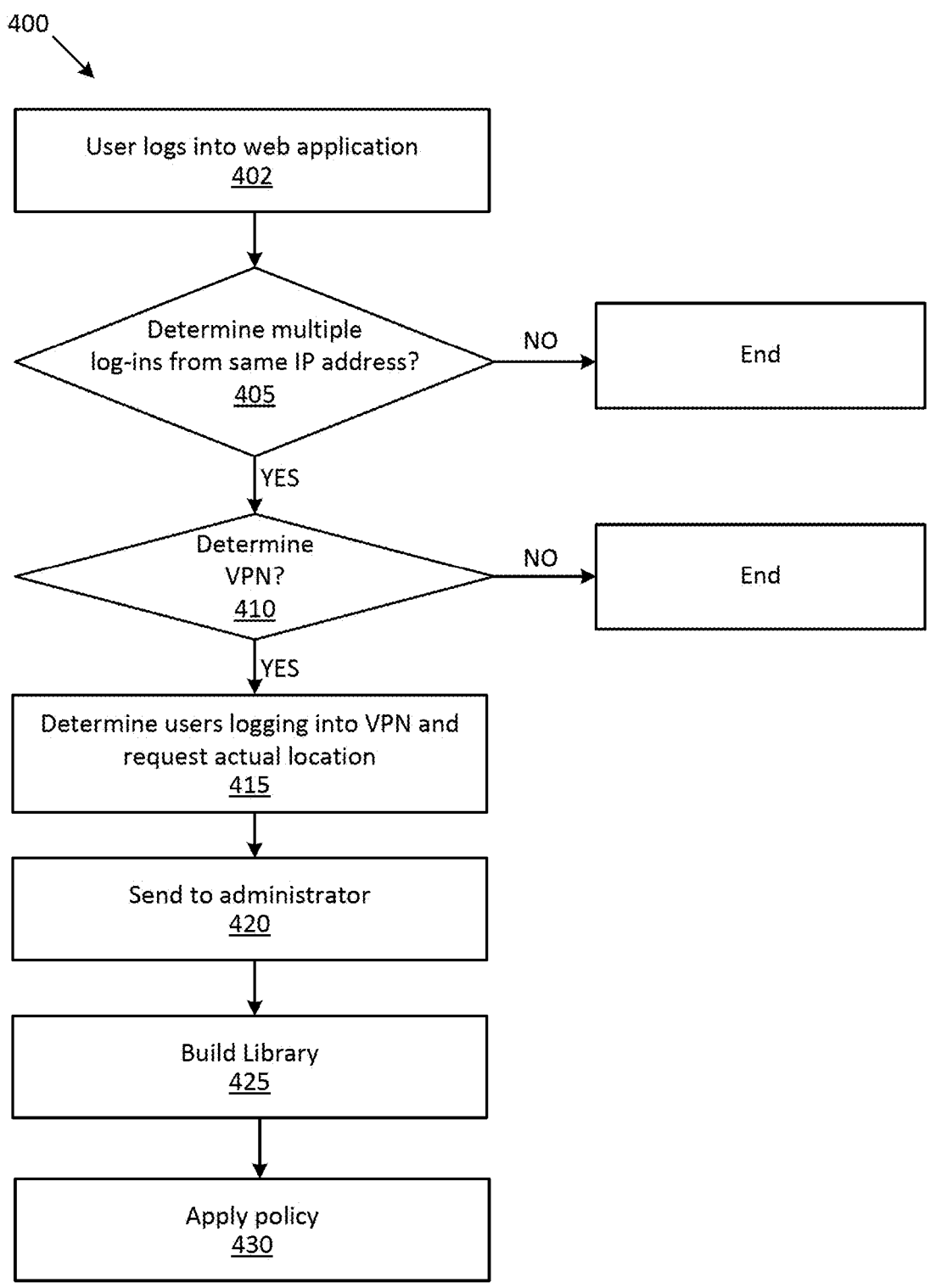
FIG. 4 depicts an exemplary flow process for identifying a location of users accessing an application through a virtual private network (VPN), in accordance with aspects of the present disclosure.

FIG. 4 shows processes to identify a location of users accessing an application through a virtual private network (VPN) such as can be associated with a work location (e.g., headquarters, satellite office, etc.) of a company. In some embodiments, the process 400 can be implemented by the computing system 100 which can be operating within the computing environment 200. At step 402, a user accesses a web application through a log-in process. At step 405, the processes determine whether multiple logins are using a same IP address. If not, the processes end.

If there are multiple logins using a same IP address, at step 410, the processes determine whether the IP address is associated with a VPN. If it is determined that the IP address is associated with a VPN, the processes continue to step 415.

At step 415, the processes determine which users are using the VPN and requests their actual location. At step 420, the location of the VPN, the actual location and, in embodiments, a user identification, can be sent to the administrator and stored in a database, e.g., data device 120 shown in FIG. 1. At step 425, the processes build a library of this information to associate the VPN address with an actual location of the users for future logins as described with the flow of FIG. 3. At step 430, a policy can be applied based on the actual location of the user using the VPN.

Figure 5:
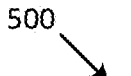
FIG. 5 depicts an exemplary flow process for identifying multiple IP addresses associated with a single location, in accordance with aspects of the present disclosure.
Figure 5:
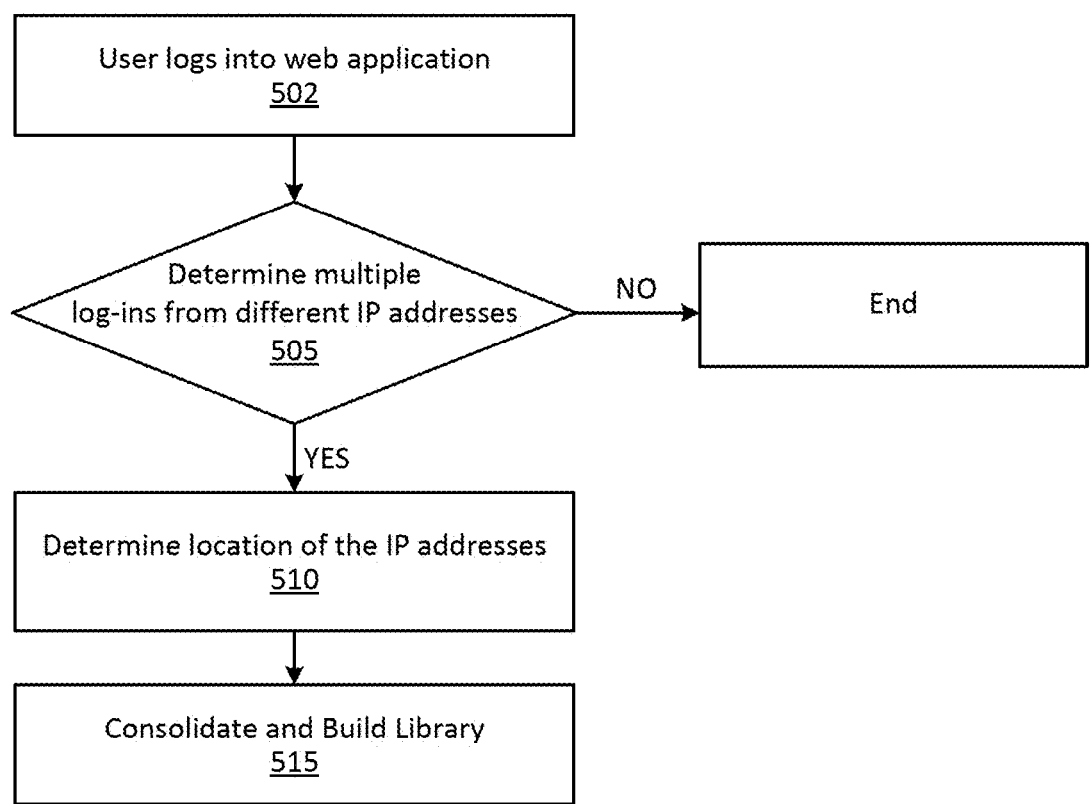

FIG. 5 shows processes to identify multiple IP addresses associated with a single location. In some embodiments, the process 500 can be implemented by the computing system 100 which can be operating within the computing environment 200. At step 502, a user logs into the web application. At step 505, the processes determine whether multiple logins are from different IP addresses. If so, at step 510, the processes determine whether the different IP addresses are within the same or near the same location. For example, the processes can determine that the different IP addresses are associated with a single warehouse or a campus (e.g., work or college campus). This can be determined through the library described with respect to the flow of FIG. 3 (or users providing their actual location through the processes shown in FIG. 3). As in each of the different embodiments, this allows the data (e.g., IP address and physical location) to be categorized and consolidated, thereby facilitating the review process and application of policies by an administrator, e.g., web access approval or rejection, timekeeping, etc. More specifically, in this way, the administrator, e.g., supervisor, can easily determine the location of the users and, if necessary, "clock" the employee (e.g., track remote employee hours worked for payroll), deny or permit access to certain applications, or implement other administrative functions (policies), etc.

At step 515, the different IP address can be consolidated into a single actual location (using the processes of FIG. 3, for example). Step 515 can also include the building of a library with this information for future reference.

Figure 6:
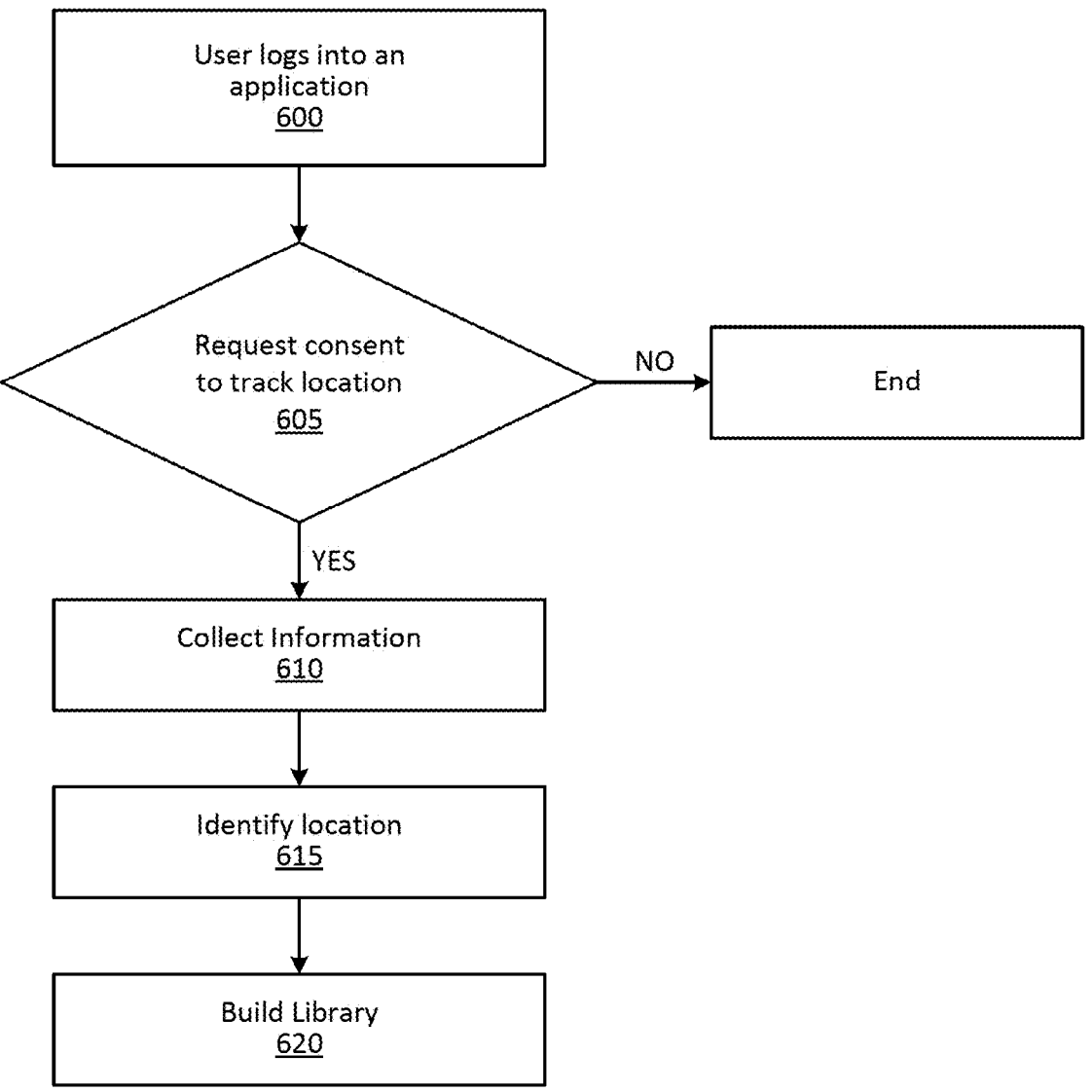
FIG. 6 depicts an exemplary flow process for building a precise location library using crowdsourcing, in accordance with aspects of the present disclosure.

FIG. 6 shows a process of building a precise location library using crowdsourcing, e.g., sample size of users, accessing mobile application(s) or web-based application(s) through a network. For example, at step 600, a user logs into an application. This can be done via a mobile device, laptop or other computing system. At step 605, the processes request consent to track the physical location of the user as described above. For example, the processes request permission from the user to collect user's physical location, e.g., longitudinal/latitudinal information and/or GPS coordinates, and IP address information. The IP address information can be IP address, IP address type, etc. If the user denies permission, the processes end.

At step 610, upon opting-in, for a web-based application, the processes will collect and store IP address information (e.g., IP Address and IP Address Type (e.g., ISP, dynamic or VPN), and longitudinal/latitudinal coordinates. In a mobile application, the processes will capture and store IP address information and GPS location of the user's device. In embodiments, the processes can also collect and store additional information including the unique ID of the user and unique ID of a client.

Using the obtained information, e.g., IP address information and location information (longitudinal/latitudinal coordinates and/or GPS location), at step 615, the processes will categorize the location as personal, business, public locations, residential, amongst other possible identifiers. In embodiments, the location can be a general location such as a geo-boundary around a particular location, e.g., a perimeter building, etc., or a specific location such as an address.

At step 620, the physical location of the sample set of users are used to create a precise location library, correlating the learned physical location of the users to the collected IP addresses or other IP information (e.g., VPN vs. dynamic IP address vs. static IP address). In embodiments, the precise location library can be stored in a database, e.g., data device 120 shown in FIG. 1, as a look-up table. In embodiments, the processes will iteratively continue over each user of the sample set of users to learn correlations between the users' physical locations and their collected IP address information.

In embodiments, the precise location library can be used to apply enforcement policies, e.g., permission for time capture access across channels. For example, an IP address of a user logging into a mobile application can now be correlated to a physical location of the user by accessing the precise location library, e.g., look-up table. Illustratively, the IP address of the user logging into the web-based application or mobile application can be compared to an IP address in the precise location library. A match between the IP addresses or within a range of such will be correlated with the learned physical location to ascertain the physical location of the user. The physical location of the user can then be used to enforce any of the applied policies as described herein, e.g., permissions for time capture access across channels.

Figure 7:
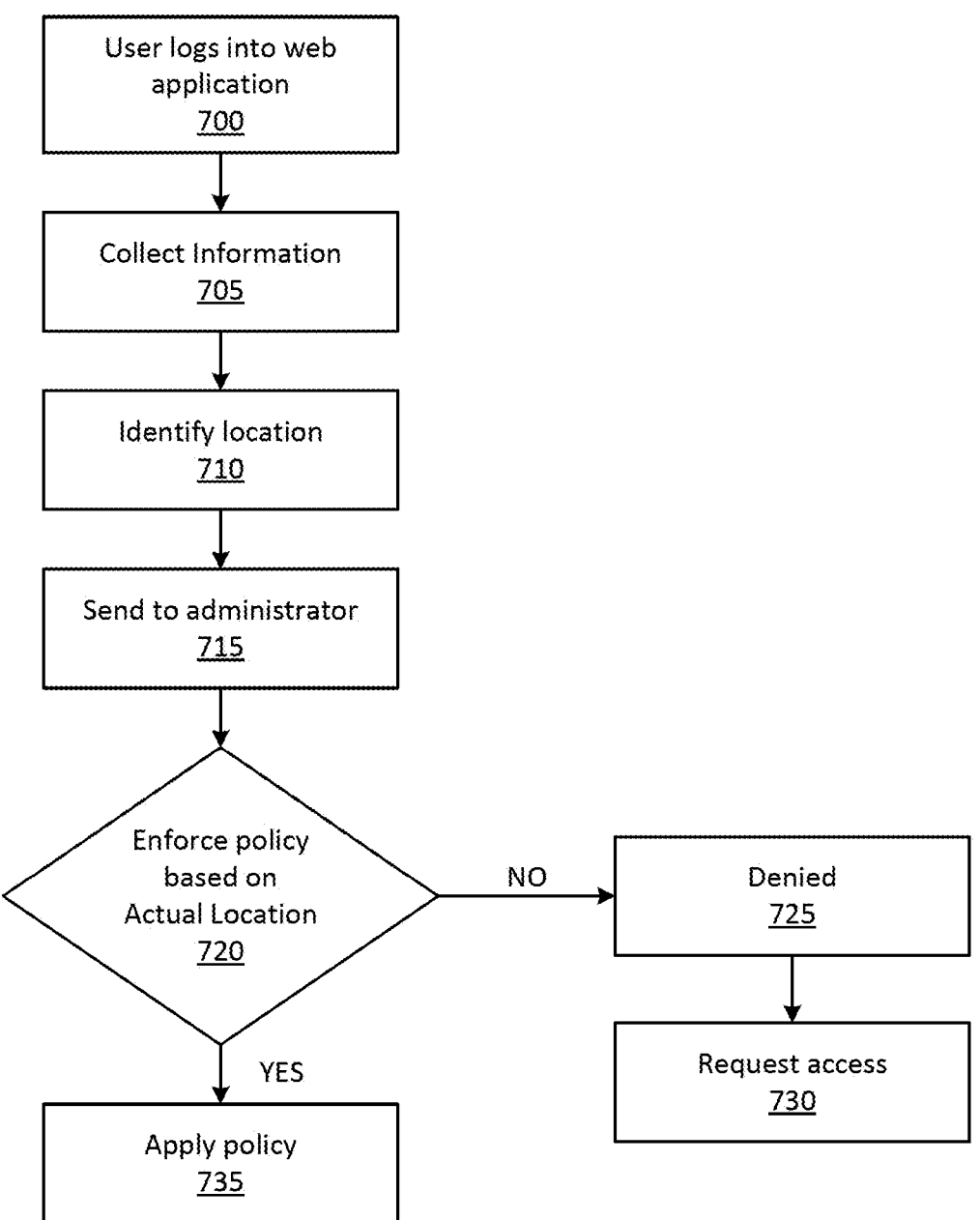
FIG. 7 depicts an exemplary flow process for applying policies against a user logging into a web application and/or mobile application, in accordance with aspects of the present disclosure.

FIG. 7 shows a process of applying policies against a user logging into a web application and/or mobile application. For example, at step 700, the user logs into an application via a mobile device, laptop or other computing system. During the login, the processes identify the user by obtaining the user's credentials, e.g., user's unique ID. At step 705, the processes determine the IP address of the user in the manner as already described herein. At step 710, the processes determine the physical location of the user by correlating the IP address information of the user to the IP addresses of the precise location library. For example, the IP address of the user is matched to an IP address in the precise location library which, in turn, is used to determine the physical location of the user. In optional embodiments, at step 715, the user's location can be displayed to an administrator, overlaid onto a map as shown, for example, in FIG. 8.

In embodiments, it is also contemplated to track a user logging into a mobile application and then web-based application or vis versa in a short period of time. In this way, the processes learn login behavior across applications. This can be used to detect, for example, abnormal logins, i.e., the employee never logged in, e.g., from at a particular location or through a particular device or through the mobile application, which can be indicative of abnormal behavior which is used to flag the login transaction.

At step 720, a determination is made whether a particular policy will be enforced against the user based on their physical location, e.g., whether the user can access the application or, for example, capture time during use of the application. By way of example, the processes can use the user's unique ID (which was obtained at logging onto the application) and the physical location of the user to determine whether a certain policy can apply to the user.

At step 720, should the location be declined or a specific user (e.g., employee) be declined to use a specific location, e.g., on the next login at that location, at step 725, the user would be informed that they are not approved for that location and time capture would not be available (or other policy would be enforced). At step 730, the user can request access to the web-based application or mobile application. This request can be provided to an administrator of the web-based application or mobile application by an automated email, text message or other electronic communication as is known in the art. At this stage, the administrator can manually approval access the web-based application or mobile application and provide, e.g., time capture capabilities for the mobile application or web application at the same location which was previously denied. Should, on the other hand, at step 720, the location be accepted, the user gains access to the particular web application or mobile application at the user's location and certain policies would be enforced, e.g., time capture, at step 735.

As an alternative approach, the administrator can request validation of the physical location of the user. The user can manually enter the validation. In this way, the validated address can be used for further learning, e.g., to populate the precise location library by correlating the validated location to the IP address of the user. Also, in embodiments, the processes can capture both the adjusted location (e.g., validated location) and the approximate location (original location as determined from the precise location library).

In embodiments, different policies can be enforced for different users at different locations. For example, the policies can be provided at set-up and can include: (i) clocking in and out the employee authorized to work at certain locations; (ii) tax jurisdiction assignment based on location of work or location of residence of the user; (iii) overtime policy assignment (which can be adjusted by the administrator) based on location of work or location of residence of the user; (iv) define primary work location, (v) provide time zone allocation; and/or (vi) access permissions (e.g., permit or deny access to certain data based on high risk locations), etc. In using the processes described herein and particularly the flow of FIG. 7 it is now possible to auto-approve or decline access to particular mobile applications or web applications and/or enforce polices associated with the users trying to access the applications at particular locations.

Figure 8:
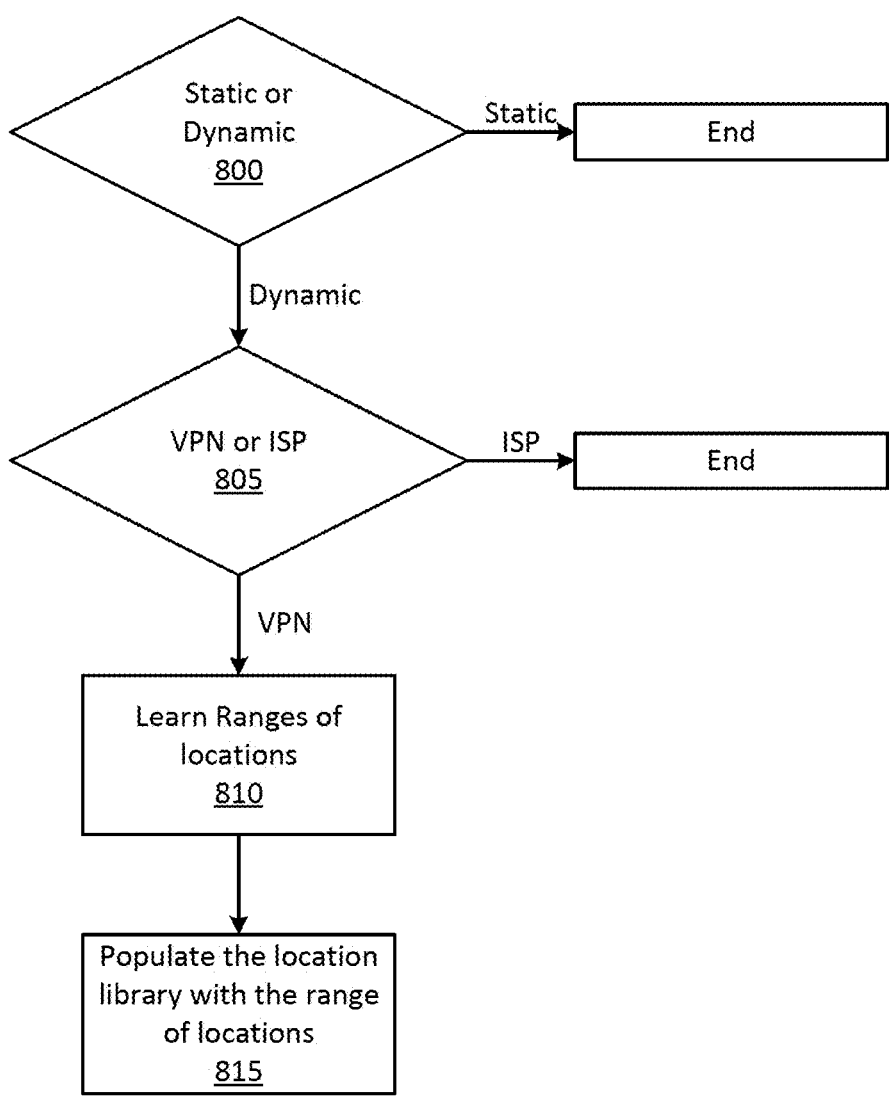
FIG. 8 depicts an exemplary flow process for accelerating learning based on collected data across the sample user group, in accordance with aspects of the present disclosure.

FIG. 8 shows processes to accelerate learning based on collected data across the sample user group (e.g., crowd-sourcing). For example, at step 800, a determination is made as to whether the IP address is static or dynamic. As should be understood by those of skill in the art, a static IP address is assigned to a particular device, where the IP address does not change. As should also be understood by those of skill in the art, static IP addresses do not change, even if the user remains offline for a period of time, On the other hand, a dynamic IP address is assigned by the network when the user connects. The IP address type can be determined from a computer's ipconfig, e.g., whether the device is "DHCP Enabled". If not DHCP Enabled, the device has a static IP address; whereas if it is DHCP Enabled, the device has a dynamic IP address.

At step 805, if the IP address is a dynamic IP address, the processes determine (and will learn) whether the device is accessing the application via a VPN or ISP. In embodiments, the access by a VPN can be determined by, for example, detailing connection timestamps and ports, in addition to the amount of traffic traveling to and from the user's device. For example, an ISP can see the following information when accessing a VPN: (i) the real IP address; (ii) the IP address of the VPN server; (iii) the port used by the VPN protocol; and (iv) connection timestamps. At step 810, if it is determined that a dynamic IP address is being used, the processes learn the IP ranges (e.g., respective locations associated with the IP ranges) of the VPN. At step 815, the processes will populate the precise location library with the correlated ranges of IP address information and locations of users accessing an application through the VPN. Accordingly, this information obtained in the processes of FIG. 8 can be used to learn correlations between the IP address information and physical location of the sample of users in the crowdsourcing. This information can be used to refine and update the precise location library, e.g., to improve the correlation of IP address information to physical locations of the users, for future users using VPN and dynamic IP addresses, for example.

Figure 9:
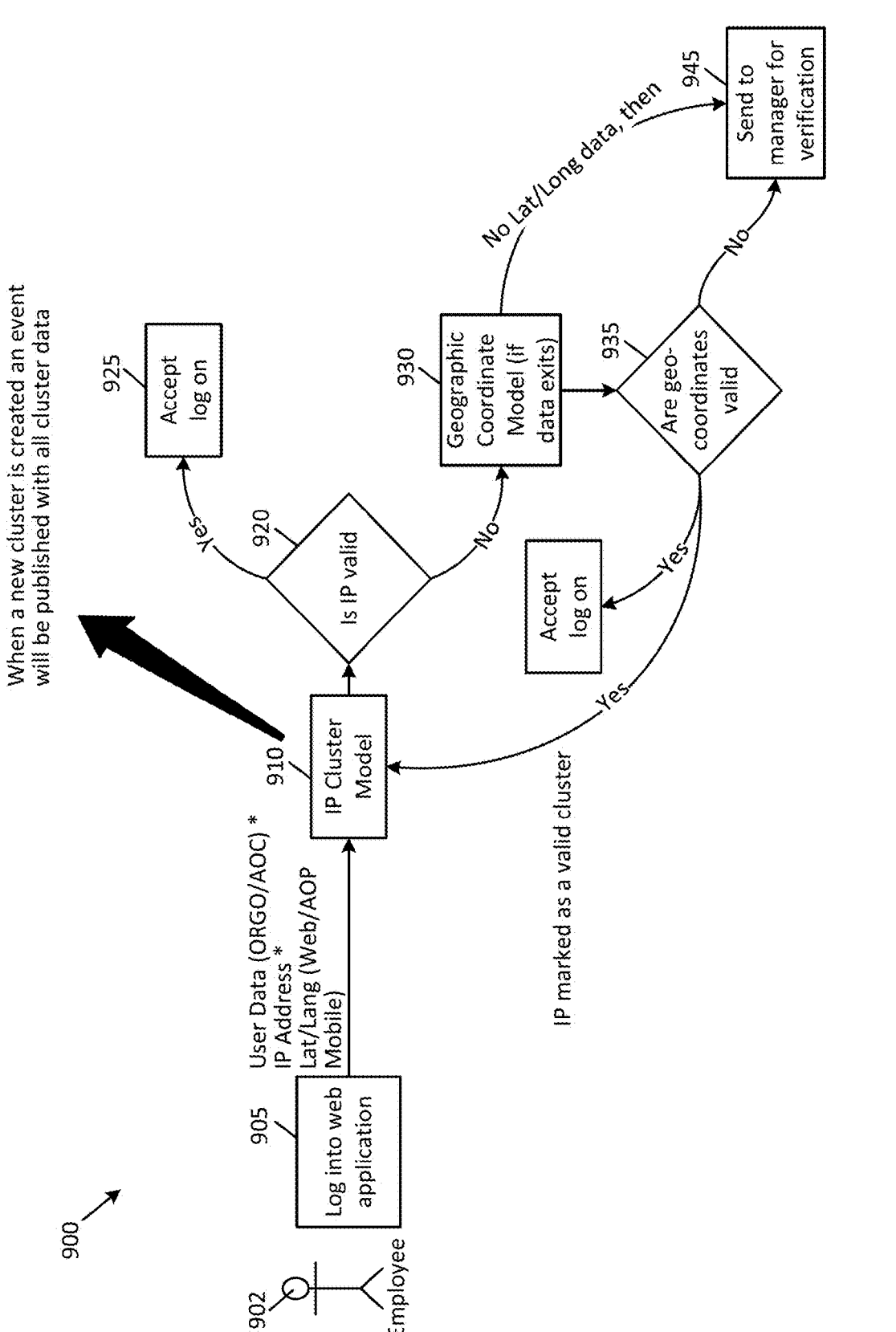
FIG. 9 depicts an exemplary flow process evaluating the user login into a web application using one or more machine learning models, in accordance with aspects of the present disclosure.

FIG. 9 shows a process for 900 for evaluating the user login into a web application using the clustering model 170 and the geographic model 175, according to an exemplary embodiment. In some embodiments, the process 900 can be implemented by the computing system 100 which can be operating within the computing environment 200. In some embodiments, the process 900 can be specifically used to evaluate an employee login into an employee web application. At 905, a user, such as an employee 902, logs into a web application by accessing an employment website and entering any necessary credentials to access the web application. In some embodiments, the user can log into a web application through the client device 210. When the user logs into the web application, the employee management cloud 215 can collect login data. The login data can be stored in an IP address library. Specifically, the login data can include user data (e.g., identifying information, log in credentials, employee unique identification, etc.), the IP address associated with the client device, an approximate location, the web channel used to access the web application, and the geographic coordinates of the client device if available. In some embodiments, the geographic coordinates of the client device can be available if the computing system can detect when the user is logging into web application from or near a mobile device which is able to provide a geographic location of user. For example, the user can be logging into the web application through a laptop, but their mobile device is within a certain proximity (e.g., accessible for the user reach within a certain period after the user attempts to log into the web application). If such a feature is enabled, the user can be prompted to confirm their location with the mobile device through an employer authentication application after attempting to log into a web application.

After the user attempts to log into the web application, the log in data is provided as an input to the clustering model 170 at step 910. In some embodiments, the clustering model 170 is configured to store an IP address library of valid IP addresses. At 910, the clustering model 170 can be configured to receive the log in data (e.g., the IP address of client device, identity of the user, credentials of the user, etc.). The clustering model 170 can then compare the log in data to the IP address library to determine a valid location associated with the IP address. In some embodiments, the IP library can include a cluster of IP addresses which are all associated with one location. In some embodiments, the clustering model 170 can create new clusters after a certain criterion has been met. For example, if a certain number of devices with new IP address attempt to log into a web application from the same location, a cluster can be formed for any IP address that try to log into the web application from that location. If the IP address is determined to be valid by the clustering model 170 at step 920, then the user log on is accepted by the employment system at step 925. The IP address can also be marked as valid and used to update and further train the IP cluster model. Upon verification of the actual location associated with the IP address, the approximate and actual location can be stored in the IP address library.

If the IP address is not determined to be valid by the clustering model 170, the process 900 proceeds to step 930 where the log in data is evaluated by the geographic coordinate model if geographic coordinates were provided as part of the log in data. In some embodiments, the geographic model 175 determines whether the geographic data received when the user attempts to log into the system is valid. If the IP address is determined to be valid by the clustering model 170 at step 935, then the user log on is accepted by the employment system at step 940. The IP address can also be marked as valid and used to update and further train the IP cluster model. If the IP address cannot be validated by either the IP cluster model 170 or the geographic model 175, then the user log in can be declined and sent to a system administrator for verification at 945. If the IP address and corresponding location is declined, the employee management system can provide a notification or pop-up user interface telling the user that the login has been declined and any specific work actions (e.g., capturing time, etc.) which would require approval would be blocked.

Figure 10:
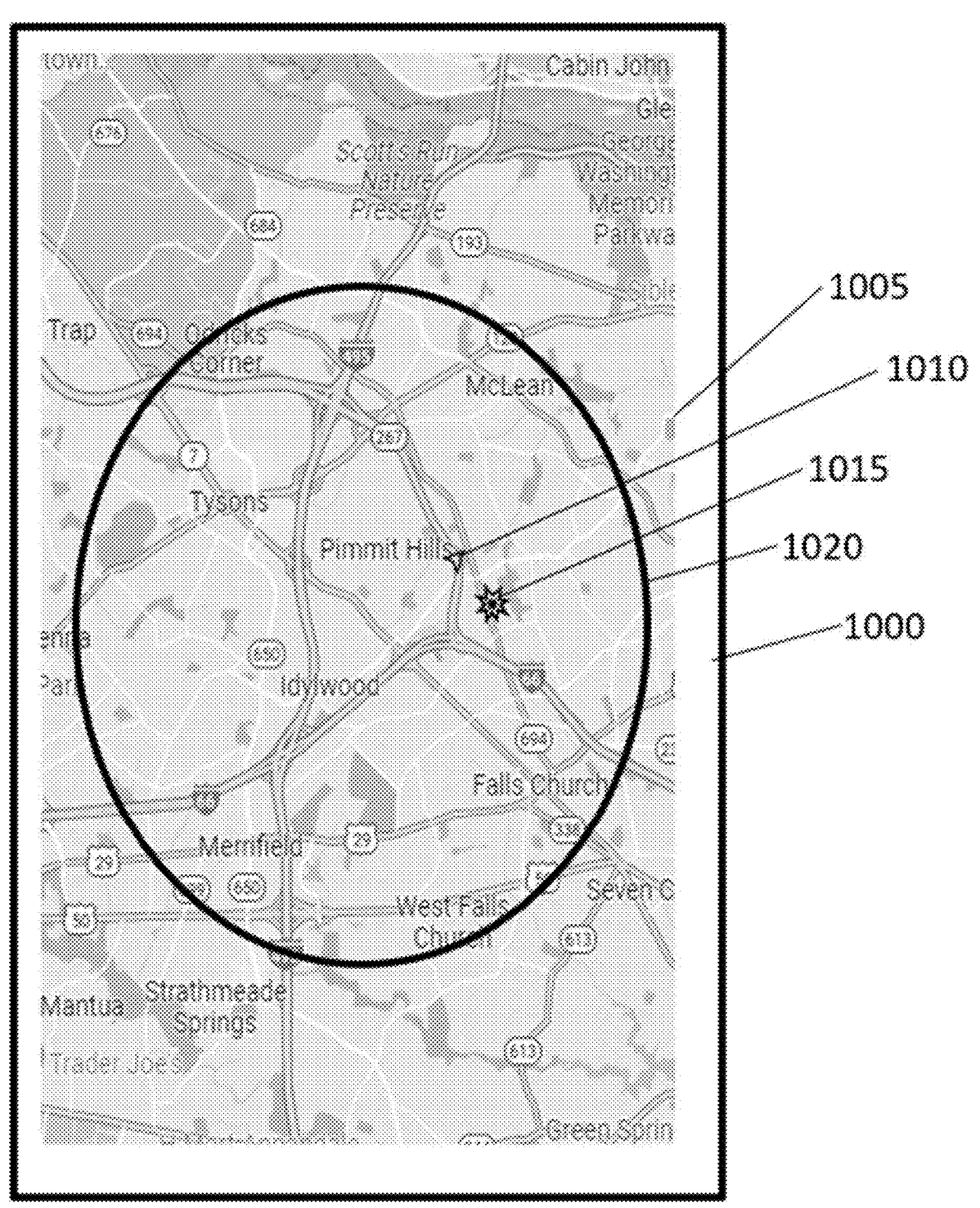
FIG. 10 depicts an exemplary user interface associated with a user logging onto a web application, in accordance with aspects of the present disclosure.
Figure 11:
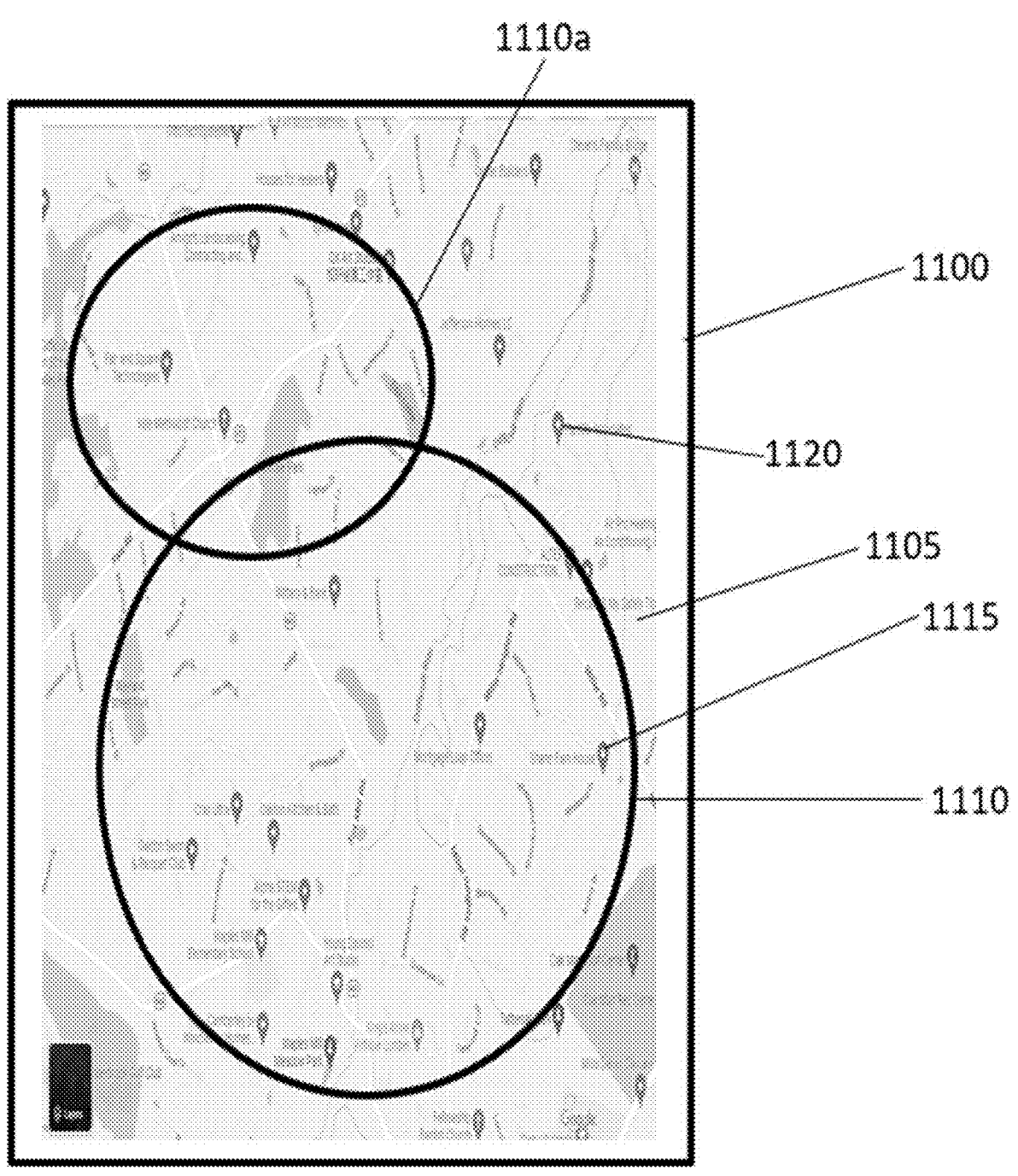
FIG. 11 depicts an exemplary interface associated with an administrator tracking locations of users logging onto a web-based application or mobile application, in accordance with aspects of the present disclosure.

FIGS. 10 and 11 show various user interfaces and underlying functionality in accordance with aspects of the present disclosure. The user interfaces can be provided using one or more program modules such as program modules 165 described with respect to FIG. 1. In embodiments, separate modules can be integrated into a single module. Additionally, or alternatively, a single module can be implemented as multiple modules. In practice, the environment can include additional devices and/or networks; fewer devices and/or networks; different devices and/or networks; or differently arranged devices and/or networks than illustrated in FIG. 1.

FIG. 10 shows an exemplary user interface 1000 associated with a user logging onto a web application, for example. In embodiments, upon logging into a web application and opting into the functionality described herein, for example, a mapping application 1005 can be displayed on the user's graphical user interface (e.g., computing screen). The mapping application 1005 includes an approximate location 1010 of the user based on their IP address. The user can provide the actual location 1015 in the mapping application 1005 using a drag and drop operation (of a pin, for example). The user can also validate that the approximate location as the actual location. The mapping application 1005 can also include a geo-boundary 1020. In embodiments, the geo-boundary 1020 can visually signify to the user that they are within or outside of a boundary that allows access to the web application or applies to another policy. In embodiments, the user can request an exception to the policy when the actual location is outside of the geo-boundary 1020.

More specifically, FIG. 11 shows an exemplary interface 1100 associated with an administrator tracking locations of users logging onto a web-based application or mobile application, for example. As should be understood by those of skill in the art, the mapping application 1105 can consolidate all users' locations into a single interface within a mapping application 1105 which, in turn, provides improved day to day management capabilities. The user's locations can be, for example, a specific address, a perimeter around a building, within a specific retail store or office building or other defined location with a certain boundary and/or with a default tolerance, e.g., 100 feet. As described herein, the user's locations can be obtained from learned locations using crowdsourcing based on IP addresses and associated physical location of other users. In this way, the mapping application 1100 provides the administrator with a visual display of the footprint of the user (and their physical location), whether they are working within an authorized location as an example, and whether policies should be enforced, e.g., allow automated time capture upon log into the application by the user. In this way, there is no set-up time for the administrator which eliminates the need for the administrator to correlate IP addresses with a physical location and then manually set up, for example, time capture processes.

In embodiments, the user interface 1100 includes the mapping application 1105 with a geo-boundary 1110. The geo-boundary 1110 indicates a boundary associated with certain policies to be enforced as described herein. The mapping application 1105 further includes the actual location 1115 of users within the geo-boundary 1110 and the actual location 1120 of users outside the geo-boundary 1110. The locations 1120 and 1115 can be obtained from the precise location library as already described herein, which is interlaid onto the mapping application 1105. The information of each user can include, e.g., name, device type, location, requests, etc. Additional information can also be displayed such as, surface count of employees, which applications are being accessed by which users, e.g., accessing a particular web-based application or mobile application, the IP address tied to the physical location, the type of device the user is using to access a particular application, if any violation of a policy is detected and by which user, accessing the applications via a VPN, etc.

As seen in FIG. 11, additional geo-boundaries 1110a can be overlaid on the mapping application 1100 for different policies. In embodiments, the geo-boundaries 1110 can visually signify to the administrator that a user is within or outside of a boundary that allows access to the web application or mobile application which can be associated with a particular policy. More specifically, the geo-boundaries 1110 indicate a boundary associated with certain policies to be enforced as described herein. For example, a user within the geo-boundary can be flagged (e.g., validated) as being able to access a time capture program; whereas a user outside the geo-boundary can be flagged (e.g., invalidated) and denied access to the same time capture program. Being outside of the geo-boundaries 1110 can be indicative of denial of access to the web-based application or mobile application; whereas being inside of the geo-boundaries 1110 can be indicative of allowing access to the web-based application or mobile application. Being inside of the geo-boundaries 1110 can be indicative of other policies being enforced, where one or more policies can be associated with each geo-boundary 1110. In embodiments, the administrator can adjust the geo-boundary to a larger or smaller boundary or to encompass different locations and different policies to enforce within the geo-boundaries.

The geo-boundaries 1110, 1110a can overlap; although other configurations are contemplated herein depending on the particular policy implementation. Moreover, in embodiments, the administrator can adjust the geo-boundary to a larger or smaller boundary or to encompass different locations and can allow or deny access to the programs (e.g., time capture program) based on the adjusted boundaries. Also, in embodiments, the administrator can have the option to manually adjust any of the geo-boundaries to include users that are near the geo-boundary 1110 such as user 1115, e.g., allow the administrator to reverse automated decisions and flag non-restricted employees, as an example. In this way, the tools provided herein can further learn preferences of the administrator, which would allow updates to the precise location library, and which can then be applied to subsequent users.

FIG. 11 can equally be representative of a display of the library of all locations that have been previously approved for selected employees. The display can include, for example, a list of employees approved for the location and provide the particular web-based applications or mobile applications that are approved for the location displayed on the display 1100, e.g., mapping application 1105 or within the geo-boundary 1110. Also, the display can be dynamic which allows an administrator to reverse any automated approval or denial decision which can be used for future decisions.

In addition, the mapping application can stack all web and mobile approved locations under single pin on a map. This can allow, for example, a surface count of employees, a list of employees, a surface IP address tied to a physical location and/or a surface location marked as a VPN. It should be understood by those of skill in the art that the term "surface" refers to the visual display of information on a mapping application, as an example.

Accordingly, as should be understood by those of skill in the art, the mapping application can consolidate all users' locations into a single interface within a mapping application 1100 which, in turn, provides improved day to day management capabilities. In this way, the mapping application 1100 provides the administrator with a visual display of the user (and their actual location) and whether they are working within an authorized location as an example, or other policies need to be enforced.

Figure 14:
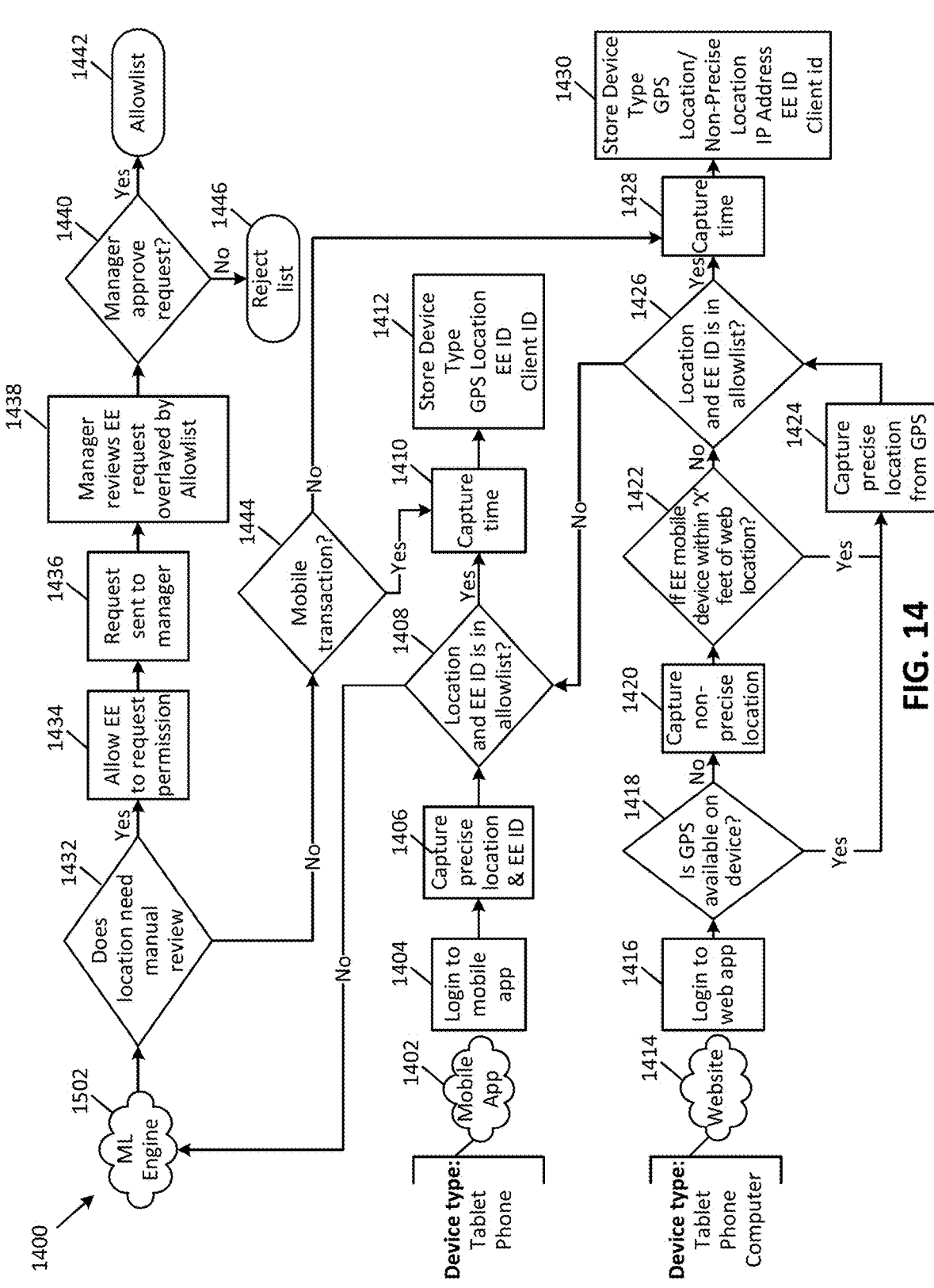
FIG. 14 depicts a process for automated website application and mobile application time capture, according to an exemplary embodiment.

FIG. 14 shows a process for 1400 for automated time capture is shown, according to an exemplary embodiment. In some embodiments, the automated time capture can be done through a mobile application while in other embodiments, the automated time capture can be one through a website application. The mobile application and website application can be any type of employment application configured to facilitate time capture and any other type of employment activities.

With regards to the mobile application, the process for automated time capture starts at step 1402. At 1402, a user, such as an employee, logs into a mobile application by accessing an employment mobile application on a user device and entering any necessary credentials to access the mobile application. In some embodiments, the user can log into a mobile application through the client device 210. In some embodiments, the client device can be mobile device such as a cellphone or a tablet.

After the user logs into the mobile application, the employee management cloud 215 can capture employee data at step 1404. In some embodiments, the employee data my include precise location of the client device 210. Further, the employee data can include other employee information including employee identification data (e.g., identifying information, log in credentials, employee unique identification, etc.). If the client device 210 is mobile device with access to the mobile application for logging in, the client device 210 can provide its precise location to the employee management cloud 215.

At step 1406, it is determined whether the precise location and the employee identification are able to be captured from the client device 210 (e.g., mobile phone, tablet, etc.). Particularly, the employee management cloud 215 can determine whether the client device 210 has certain permissions enabled in order to share location information and other identifying information about the client device 210 and the employee associated with the client device 210. In some embodiments, this information can include an employee identification number, an employee name, and/or any other identifying information about the employee.

After the location and employee information is received from the client device 210, the employee management cloud 215 can determine, at 1408, whether the employee as identified by their employee ID and their location is included in a predetermined list (e.g., allowlist 1442) of employee IDs/locations which are confirmed as being correct and allowed. Particularly, the allowlist 1442 includes a list of employees as identified by name, identification number, or any other identifier and one or more addresses where the employee has been approved to work. For example, a first employee can be approved to work and capture time at a first location (e.g., office) and second location (e.g., home) whereas a second employee is only approved to work at a first location (e.g., office). In some embodiments, the allowlist 1442 is determined based on the IP address library which is populated with employee location information as described.

If the location and employee information is on the allowlist 1442, the process 1400 proceeds to step 1410 where the employee is granted permission to begin capturing time. At step 1412, the employee management cloud 215 stores information related to client device 210 and employee who is now able to capture time. Particularly, the device type (e.g., mobile phone, tablet, etc.), precise location (e.g., GPS location), employee identification number, and client identification number, among other information can be stored by the employee management cloud 215.

If the location and employee information is not on the allowlist 1442, the process 1400 proceeds to process 1500 where a machine learning engine 1502 determines whether the employee location is allowed or not. The process 1500 is described in more detail below with respect to FIG. 15.

Figure 15:
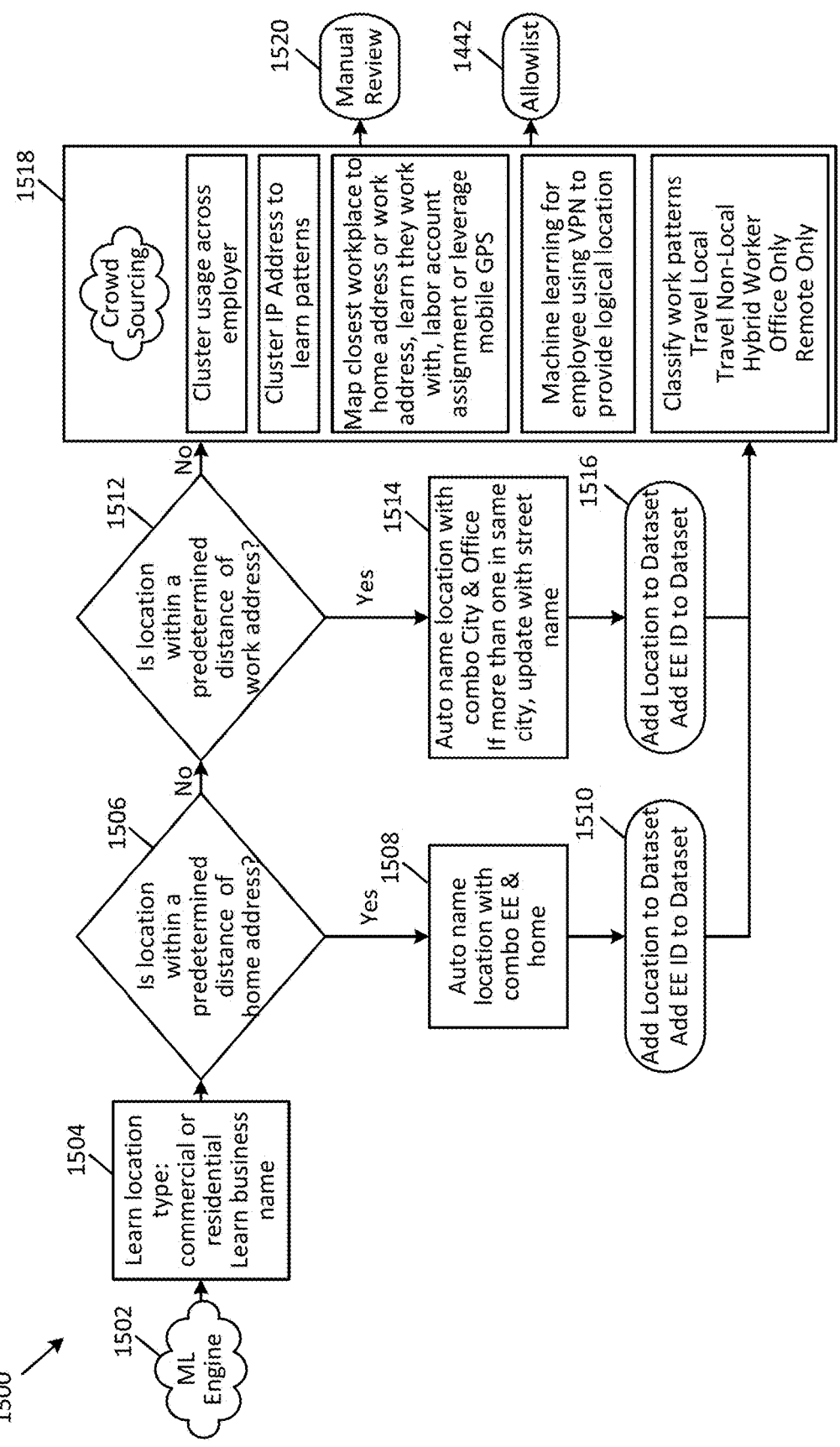
FIG. 15 depicts a process for automatically applying policies using a machine learning engine, according to an exemplary embodiment.

Referring now to FIG. 15, the process 1500 for automatically applying statutory and/or organizational policies using a machine learning engine is shown, according to an exemplary embodiment. In some embodiments, the process 1500 is implemented by the machine learning engine 1502. The machine learning engine 1502 can be configured to serve two functions. First, the machine learning engine 1502 can be configured to evaluate employee locations which were determined to not be found in the allowlist 1442. Particularly, the machine learning engine 1502 evaluates those location using various machine learning/artificial intelligence algorithms to determine a logical location for the employee if possible. If a logical location is able to be determined, the location information can be added the allowlist 1442. Otherwise, the machine learning engine 1502 can classify the location as needing manual review by a manager. Second, the machine learning engine 1502 is configured classify work patterns for the individual and automatically apply statutory and/or organizational policies for the worker based on the classified work patterns.

Before the process 1500 begins, the machine learning engine 1502 receives the location of the employee as determined by the process 1400. As described above, a user device such a mobile phone or a tablet can provide a location of an employee when they log into an employment application. If the location is determined to not be part of the allowlist 1442, the location is provided to the machine learning engine 1502 for further evaluation.

At step 1504, the machine learning engine 1502 learns the type of location received from the user device. In some embodiments, the machine learning engine 1602 can determine whether the location is commercial or residential location. If the location type is commercial, the machine learning 1502 determines a business name for the commercial location. For example, the commercial location can be the workplace for the employee. In that case, the machine learning engine 1502 determines the name of the workplace which can be the name of the employer. As another example, the commercial location can be any other type of third-party commercial location which is not associated with the workplace for the employee (e.g., cafés, co-working spaces, libraries, hotels, airports, restaurants, etc.). In that case, the machine learning engine 1502 determines the name of the third-party location.

At step 1506, the machine learning engine 1502 determines whether the location received from the user device is within a predetermined distance of the employee's home address? In some embodiments, the employee's home address can be stored in payroll/employee directory and the machine learning engine 1502 pulls the home address from the directory for the determination. In other embodiments, the employee's home address can be determined by other means such as through public records. In yet other embodiments, the machine learning engine 1502 can use machine learning and any publicly available mapping directory (e.g., Google Maps, Apple Maps, MapQuest, etc.) to automatically populate a home address for the employee.

If the machine learning engine 1502 determines that the location received from the user device is within the predetermined distance of the home address, the machine learning engine 1502 automatically assigns a name to the location. In some embodiments, the name assigned to the location with include an employee identifier (e.g., employee name, employee identification number, etc.) and the label "home" at the step 1508. At step 1510, the machine learning engine 1502 adds the named location and the employee identifier to a dataset for further evaluation. If the machine learning engine 1502 determines that the location received from the user device is not within the predetermined distance, the machine learning engine 1502 proceeds to step 1512. In some embodiments, the machine learning engine 1502 can determine a boundary for the location based on the outline of a building perimeter associated with the address. For locations that lack a physical address, the machine learning engine 1502 can automatically name the location with a nearby address. Further, for such locations, the machine learning engine 1502 generates a boundary by using use pin cluster from crowd sourcing web location and/or mobile physical location to define boundary with default tolerance.

At step 1512, the machine learning engine 1502 determines whether the location received from the user device is within a predetermined distance of the employee's work address? In some embodiments, the employee's work address can be stored in payroll/employee directory and the machine learning engine 1502 pulls the work address from the directory for the determination. In other embodiments, the employee's work address can be determined by other means such as through public records. In yet other embodiments, the machine learning engine 1502 can use machine learning and any publicly available mapping directory (e.g., Google Maps, Apple Maps, MapQuest, etc.) to automatically populate the workplace address for the employee.

If the machine learning engine 1502 determines that the location received from the user device is within the predetermined distance of the work address, then at step 1514, the machine learning engine 1502 automatically assigns a name to the location. In some embodiments, the name assigned to the location with include combination of the city and workplace label (e.g., office, headquarters, plant, etc.) at the step 1508. For example, the name be "Chicago Office". If the workplace has multiple locations within the same city, the name can also include street name. (e.g., Chicago Office, Michigan Avenue). At step 1516, the machine learning engine 1502 adds the named location and the employee identifier to a dataset for further evaluation.

At step 1518, the machine learning engine 1502 evaluates the locations and employee identifiers in the dataset created and updated at steps 1510 and 1516. In some embodiments, the machine learning engine 1502 can utilize crowdsourcing techniques to evaluate the locations to determine whether they can be added to the allowlist 1442 or if they manual review 1520. As described above, crowdsourcing involves obtaining employee location information such as the dataset in steps 1510 and 1516. In embodiments, the employee location information can be automatically collected from users logging onto employment applications including, e.g., time capture, human resources, benefits system, payroll system or other employment applications. The information can include addresses, longitudinal/latitudinal information, or global position system (GPS) coordinates. In some embodiments, the employee location information can be used as a training set by machine learning to find patterns and learn locations associated with each employee as provided by the user device for the employee. In some embodiments, the employee information can be obtained by crowdsourcing to learn patterns (e.g., physical locations of users) across a large sample size of employees, using machine learning and artificial intelligence. The patterns can be learned by using longitudinal/latitudinal or GPS coordinates of each user of the sample set of users, and associating the coordinate information (e.g., physical locations of the user) with their IP addresses or mobile device location, or by reverse web access decisions, e.g., reverse IP or DNS lookup as is known in the art. The process for using crowdsourcing to cluster usage across the employer and cluster IP addresses to learn patterns is described in more detail above with respect to FIGS. 6 and 8.

In some embodiments, the machine learning engine 1502 can map the closest workplace to the employee's home address to learn who they work with and determine a labor account assignment. In some embodiments, the machine learning engine 1502 can leverage using a GPS coordinate provided by the mobile device to determine whether the locations added to the dataset at steps 1510 and 1516 can be added to the allowlist 1442 or if they need manual review 1520. For example, if an employee logs in with a web application, the machine learning engine 1502 can request that the employee verify their location with a mobile device which is capable of providing a precise location.

In some embodiments, the machine learning engine 1502 can use machine learning techniques to determine a logical location for employee locations provided by a user device using a VPN to log into the employment application. As described above, the access by a VPN can be determined by, for example, detailing connection timestamps and ports, in addition to the amount of traffic traveling to and from the employee user device. For example, an ISP can see the following information when accessing a VPN: (i) the real IP address; (ii) the IP address of the VPN server; (iii) the port used by the VPN protocol; and (iv) connection timestamps. If it is determined that a dynamic IP address is being used, the processes learn the IP ranges (e.g., respective locations associated with the IP ranges) of the VPN. Then, the machine learning engine 1502 will determine a logical location for the employee based on this information.

In some embodiments, the machine learning engine 1502 can classify work patterns for an employee based on the frequency of their determined location when they log into the employment application. For example, an employee can be classified as having a local travel pattern if they are consistently logging into the employment application within a certain predetermined distance of their permanent workplace location or they can be classified as having a non-local travel pattern if they are consistently logging into the employment application outside a certain predetermined distance of their permanent workplace location. Further, an employee can be classified as being a remote only, office only, or hybrid pattern based on the frequency of their location when they log into the employment application.

In some embodiments, the machine learning engine 1502 can apply statutory and/or organizational policies to the individual based on their classified patterns. Particularly, the machine learning engine 1502 can be configured to learn an employee's primary work location, the employee's second work location (if applicable), and the proportion of time they work in each respective work location. Based on this location information, the machine learning engine 1502 can determine which statutory and/or organizational policies are appropriate to be applied to the employee. In some embodiments, the machine learning engine 1502 can be set up with certain rules that facilitate applying the statutory and/or organizational policies. For example, the machine learning engine 1502 can be programmed with rules regarding where the employees are capturing time (e.g., Are employees allowed to capture time from anywhere? Are employees allowed to work from home? Are employees restricted to specific workplaces? etc.).

In some embodiments, the machine learning engine 1502 can ask the user for consent to track their physical location when they log into the web application or mobile application. If consent it provided, the process continues to determine the IP address of the user in the manner as already described herein and, using this information, determines the physical location of the user by correlating the IP address information of the user to a particular location as described herein. In embodiments, the processes can categorize the physical location of the user as a business location or a residential location. In optional embodiments, the user's location can be displayed to an administrator, overlaid onto a map as shown, for example, in FIG. 11.

Then, the machine learning engine 1502 apply the appropriate rule(s) based on the physical location of the user. By way of example, the processes can use the user's unique ID (which was obtained at logging onto the application) and the physical location of the user to determine that a certain tax assignment or disability benefit, etc., applies to the user. In embodiments, different rules can be enforced for different users at different physical locations. For example, the rules can be provided at set-up and can include: tax jurisdiction assignment based on location of work or location of residence of the user; overtime policy assignment, etc. In using the processes described herein, it is now possible to auto or enforce polices associated with the users trying to access the applications at particular locations.

In embodiments, it is contemplated to track a user logging into a mobile application and then web-based application or vis versa during any predetermined time period. In this way, the processes can track the location of the user and determine a pattern based on the location. In some embodiments, an accelerated learning can be implemented in the machine learning engine 1502 based on collected data for an individual employee. These accelerated learning can be facilitated by one or more machine learning models as described herein, in order to implement the rules as described herein.

For example, the machine learning engine 1502 can learn the employees' primary work location and secondary work locations. Further, the machine learning engine 1502 can learn the proportion (e.g., percentage) of work time by location. The proportion of time the user spends in their various work locations can allow the machine learning engine 1502 to learn any anomalies to prompt workflow changes to comply with statutory rules. Specifically, the machine learning engine 1502 determines whether an employee qualifies for a rule change, e.g., short-term vs. long-term rule change, based on patterns (e.g., at what location is the employee working). These changes can be, for example, a non-exempt on-the-go worker for whom, for that time entry, different overtime rules apply. If a rule change does not apply, the processes end. On the other hand, if a rule change should apply, the processes apply the new rule change. In this way, the processes, e.g., can determine when an employee moves to a new state or changes their habits with respect to a working location. The process for applying policies to employees is described in more detail above with respect to FIG. 7.

In some embodiments, the machine learning engine 1502 determines whether the locations evaluated at step 1518 should be added to the allowlist 1442 or if they require manual review 1520. If the locations need manual review, the process proceeds back to step 1434 as described in FIG. 14.

Referring back to FIG. 14, the process proceeds to step 1432. At step 1432, it is determined whether the employee location determined by the machine learning engine 1502 in process 1500 needs manual review. If the manual review is needed, the process proceeds to step 1434. At step 1434, the user can submit a request for their location to be manually reviewed by a manager. The request is sent to the manager at step 1436. At step 1438, the manager reviews the employee request overlayed by allowlist 1442 to determine whether the employee is working at an approved location. Particularly, the manager can either approve or reject the request at step 1440. If the manager approves the employee's location, the approved location and employee identifier is added to the allowlist 1442. If the manager rejects the employee's location, the rejected location and employee identifier is added to the reject list 1446.

If manual review of the employee location is not need, the process proceeds to step 1444. At step 1444, it is determined whether the transaction is mobile transaction or a web transaction (e.g., did the user log into the employment application through a mobile application or a web application). If the transaction is a mobile transaction, the process proceeds to step 1410 as explained above and proceeds from there.

With regards to the web application, the process for automated time capture starts at step 1414. At 1416, a user, such as an employee, logs into a web application by accessing an employment web application on a user device and entering any necessary credentials to access the web application. In some embodiments, the user can log into a mobile application through the client device 210. In some embodiments, the client device can be web device such as a laptop, mobile device, or a tablet.

After the user logs into the web application, the employee management cloud 215 can capture employee data at step 1404. In some embodiments, the employee data my include precise location of the client device 210. Further, the employee data can include other employee information including employee identification data (e.g., identifying information, log in credentials, employee unique identification, etc.). If the client device 210 is mobile device with access to the mobile application for logging in, the client device 210 can provide its precise location to the employee management cloud 215.

At step 1418, it is determined whether GPS is available on the web device (e.g., laptop, phone, tablet, etc.). Particularly, the employee management cloud 215 can determine whether the client device 210 has certain permissions enabled in order to share location information and other identifying information about the client device 210 and the employee associated with the client device 210. In some embodiments, this information can include an employee identification number, an employee name, and/or any other identifying information about the employee.

If GPS is not available, the process proceeds to step 1420 where the non-precise location of the web device is captured. As described above, the non-precis location of the web-device can be determined based on the IP address received from the web device. At step 1422, it is determined if an employee mobile device (with location information sharing enabled) is within a predetermined distance of the non-precise web location received at step 1420. In some embodiments, the precise location of the employee using the web device can be available if the computing system can detect when the user is logging into web application from or near a mobile device which is able to provide a precise location for an employee. For example, the user can be logging into the web application through a laptop, but their mobile device is within a certain proximity (e.g., accessible for the user to reach within a certain period after the user attempts to log into the web application). If such a feature is enabled, the user can be prompted to confirm their location with the mobile device through an employer authentication application after attempting to log into the web application.

If GPS is available, the process proceeds to step 1424 where the precise location of the web device and the employee information is captured. After the location and employee information is received from the client device 210, the employee management cloud 215 can determine whether the employee as identified by their employee ID and their location is included in a predetermined list (e.g., allowlist 1442) of employee IDs/locations which are confirmed as being correct and allowed at step 1426.

If the location and employee information is on the allowlist 1442, the process 1400 proceeds to step 1428 where the employee is granted permission to begin capturing time. At step 1430, the employee management cloud 215 stores information related to client device 210 and employee who is now able to capture time. Particularly, the device type (e.g., laptop, phone, tablet, etc.), precise location/non-precise location (e.g., GPS location), IP address, employee identification number, and client identification number, among other information can be stored by the employee management cloud 215.

If the location and employee information is not on the allowlist 1442, the process 1400 proceeds to process 1500 where a machine learning engine 1502 determines whether the employee location is allowed or not. The process 1500 is described in more detail above with respect to FIG. 15.

The Example Use Cases Described Blow are not Meant to be Limiting

Example 1: The processes learn a precise location of the user by leveraging the Web IP address type and employee log in information from a mobile telephone at a certain location (e.g., 101 Paloma Ave, Venice 90291).

Example 2: The processes determine that there is an abnormal log in from a user, when the user first logged in at noon in Venice, CA on a mobile device and then logged in to an application later in the day in a learned location in Phoenix, AZ. In this case, the processes determine that it is highly unlikely that the user could be in Phoenix, AZ, and hence prompts the user to validate their location. Once validated, this new address can be learned for future reference.

Example 3: The processes learn a more precise location when the user first logs into a web-based application at 8 AM at a particular location, e.g., corner of Franklin and Roosevelt, and then logs into a mobile application at 12:15 PM inside a retail store. The processes will correlate the IP address learned location to inside the retail environment.

Example 4: The processes obtain IP addresses from a sample set of users. The processes obtain the physical location of each of the sample set of users. The processes correlate the IP addresses to the physical location in order to build the precise location library. The processes can utilize a mobile application that's near a person who's logging onto the application, and taking the location information of a new user, coming on board, and correlate it with the precise location library. The processes can then utilize this information for accessing a time capture program based on their IP address of when an employee logs into an application.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method comprising:

providing, by a computer system comprising one or more processors coupled with memory, on each of a plurality of computing devices, a display of an approximate location of each computing device of the plurality of computing devices;

providing, by the computer system, a plurality of interactive interface elements to the plurality of computing devices, wherein the plurality of interactive interface elements are configured to adjust the approximate location having a first resolution to an actual location having a second resolution that is greater than the first resolution for each respective computing device of the plurality of computing devices;

receiving, by the computer system, the adjustments to the approximate locations from the plurality of computing devices;

categorizing, by the computer system, one or more actual locations received from the plurality of computing devices to generate a consolidated view of the actual location for each respective computing device;

displaying, by the computer system, the consolidated view of the actual locations of each of the respective computing devices of the plurality of computing devices; and applying, by the computer system, a policy based on the actual location of each of the respective computing devices of the plurality of computing devices.

2. The method of claim 1, wherein the approximate location of each respective user of the plurality of computing devices is based on an IP address.

3. The method of claim 1, further comprising providing an interactive interface element for a user to validate the approximate location as the actual location.

4. The method of claim 1, comprising:

providing, by the computer system, the display of the approximate location via a first mapping application executed by each of the plurality of computing devices, wherein the first mapping application includes a geoboundary.

5. The method of claim 4, wherein the first mapping application on each of the plurality of computing devices is generated upon logging into a web-based application.

6. The method of claim 4, comprising:

displaying, by the computer system, the consolidated view of the actual locations via a second mapping application, wherein the second mapping application includes the geo-boundary associated with one or more policies.

7. The method of claim 6, further comprising stacking all approved locations under single pin on the second mapping application.

8. The method of claim 1, further comprising building a library that associates the actual locations to different IP addresses.

9. The method of claim 7, wherein a library refines the approximate location based on previously associated actual locations.

10. The method of claim 1, further comprising determining that a subset of the plurality of computing devices are accessing a web application through a virtual area network.

11. The method of claim 10, further comprising determining the actual location of users of the subset of the plurality of computing devices.

12. The method of claim 1, further comprising determining that multiple logins from a subset of the plurality of computing devices are from a same location.

13. A system, comprising:

one or more processors coupled with memory, the one or more processors to:

display, via one or more mapping applications on a computing device, an approximate location of the computing device;

provide a plurality of interactive interface elements to the computing device, wherein the plurality of interactive interface elements is configured to adjust the approximate location having a first resolution to an actual location having a second resolution that is greater than the first resolution for the computing device;

receive, via the interactive interface element, an adjustment to the approximate location from the computing device;

categorize an actual location received from one or more computing devices to generate a consolidated view of the actual location for each respective computing device of the one or more computing devices;

display, via the one or more mapping applications, the consolidated view of the actual locations of each of the respective computing devices of the one or more computing devices; and apply a policy based on the actual location of each of the respective computing devices of the one or more computing devices.

14. The system of claim 13, wherein the approximate location of each respective computing device of the one or more computing devices is based on an IP address.

15. The system of claim 13, comprising:

the one or more processors to provide an interactive interface element to validate the approximate location as the actual location.

16. The system of claim 13, wherein the one or more mapping applications include a geo-boundary associated with one or more policies.

17. The system of claim 13, further comprising:

the one or more processors to build a library that associates the actual locations to different IP addresses.

18. The system of claim 17, wherein the library refines the approximate location based on previously associated actual locations.

19. A non-transitory computer readable medium storing processor executable instructions that, when executed by one or more processors, cause the one or more processors to:

provide a first mapping application on each of a plurality of computing devices, the first mapping application displaying an approximate location of each computing device of the plurality of computing devices;

provide a plurality of interactive interface elements to the plurality of computing devices, wherein the plurality of interactive interface elements is configured to adjust the approximate location having a first resolution to an actual location having a second resolution that is greater than the first resolution for each respective computing device of the plurality of computing devices;

receive the adjustments to the approximate locations from the plurality of computing devices;

categorize one or more actual locations received from the plurality of computing devices to generate a consolidated view of the actual location for each respective computing device;

display, via a second mapping application, the consolidated view of the actual locations of each of the respective computing devices of the plurality of computing devices; and apply a policy based on the actual location of each of the respective computing devices of the plurality of computing devices.

* * * * *